US012792520B2

(12) United States Patent
Fu et al.

(10) Patent No.: US 12,792,520 B2
(45) Date of Patent: Nov. 10, 2026

(54) PROCESSING UNIT ARCHITECTURES AND TECHNIQUES FOR REUSABLE INSTRUCTIONS AND DATA

(71) Applicant: MemryX Incorporated, Ann Arbor, MI (US)

(72) Inventors: Zih-Sing Fu, Ann Arbor, MI (US); Wen-Cong Huang, Ann Arbor, MI (US); Chia-Hsiang Yang, Ann Arbor, MI (US); Zhengya Zhang, Ann Arbor, MI (US); Timothy Wesley, Ann Arbor, MI (US); Jacob Botimer, Ann Arbor, MI (US)

(73) Assignee: MemryX Incorporated, Ann Arbor, MI (US)

( * ) Notice: Subject to any disclaimer, the term of this patent is extended or adjusted under 35 U.S.C. 154(b) by 69 days.

(21) Appl. No.: 17/944,014

(22) Filed: Sep. 13, 2022

(65) Prior Publication Data

US 2023/0072556 A1 Mar. 9, 2023

Related U.S. Application Data

(63) Continuation of application No. PCT/US2021/047220, filed on Aug. 23, 2021.

(60) Provisional application No. 63/068,950, filed on Aug. 21, 2020.

(51) Int. Cl.

| | |
|---|---|
| ***G06F 12/0875*** | (2016.01) |
| *G06N 3/0464* | (2023.01) |
| *G06N 3/063* | (2023.01) |

(52) U.S. Cl.
CPC .... *G06F 12/0875* (2013.01); *G06F 2212/225* (2013.01); *G06F 2212/283* (2013.01); *G06F 2212/454* (2013.01); *G06N 3/0464* (2023.01); *G06N 3/063* (2013.01)

(58) Field of Classification Search
None
See application file for complete search history.

(56) References Cited

U.S. PATENT DOCUMENTS

| | | | | |
|---|---|---|---|---|
| 11,537,535 B2 * | 12/2022 | Zhang | ................. | G06F 9/30032 |
| 12,443,832 B1 * | 10/2025 | Zheng, Jr. | .............. | G06N 3/063 |
| 2016/0173451 A1 * | 6/2016 | Banville | ............. | H04L 47/6215 726/13 |
| 2017/0124025 A1 * | 5/2017 | Gokmen | ............... | G06F 9/3887 |
| 2019/0220734 A1 * | 7/2019 | Ferdman | ................ | G06F 17/15 |
| 2020/0097826 A1 * | 3/2020 | Du | .......................... | G06F 13/16 |

(Continued)

OTHER PUBLICATIONS

Choi et al. "Topology Preserving Neural Networks that Achieve a Prescribed Feature Map Probability Density Distribution." Jun. 2005. IEEE. 2005 American Control Conference. pp. 1343-1350.*

(Continued)

*Primary Examiner* — Nathan Sadler

(57) ABSTRACT

A computing system can include an off-chip memory and processing unit integrated circuitry. The processing unit IC can include on-chip compute circuitry, a first on-chip memory and a second on-chip memory. The off-chip memory can be configured to store instructions and data The first on-chip memory can be configured to store reusable portions of the instructions and or data for use by the on-chip compute circuitry. The second on-chip memory configured to cache portions of instruction and data for current use by the on-chip compute circuitry.

19 Claims, 26 Drawing Sheets

(56) References Cited

U.S. PATENT DOCUMENTS

| | | | | |
|---|---|---|---|---|
| 2020/0104167 | A1* | 4/2020 | Chen | G06V 40/174 |
| 2020/0285942 | A1* | 9/2020 | Yan | G06N 3/045 |
| 2020/0334013 | A1* | 10/2020 | Jang | G06N 3/063 |
| 2021/0182684 | A1* | 6/2021 | Zappi | G06N 3/10 |
| 2021/0192323 | A1* | 6/2021 | Whatmough | G06N 3/045 |
| 2021/0224069 | A1* | 7/2021 | Chen | G06N 3/045 |

OTHER PUBLICATIONS

Jacob et al. Memory Systems: Cache, DRAM, Disk. 2008. Elsevier. pp. 1-312.*

Anonymous. "A Simple Method to Reduce Off-chip Memory Accesses on Convolutional Neural Networks." Jan. 2019. arXiv. https://arxiv.org/pdf/1901.09614.pdf.*

Yoon et al. "Hierarchical Memory System With STT-MRAM and SRAM to Support Transfer and Real-Time Reinforcement Learning in Autonomous Drones." Sep. 2019. IEEE. IEEE Journal on Emerging and Selected Topics in Circuits and Systems. vol. 9, pp. 485-497.*

Li et al. "On-Chip Memory Technology Design Space Explorations for Mobile Deep Neural Network Accelerators." ACM. Jun. 2019. DAC '19.*

Ahn et al. "Ordering Chaos: Memory-Aware Scheduling of Irregularly Wired Neural Networks for Edge Devices." Mar. 2020. MLSys 2020. https://proceedings.mlsys.org/paper_files/paper/2020/file/79c36fe64e04b80fc44845bb9fe73242-Paper.pdf.*

Siu et al. "Memory Requirements for Convolutional Neural Network Hardware Accelerators." Dec. 2018. IEEE. IISWC 2018. pp. 111-121.*

IEEE. IEEE 100: The Authoritative Dictionary of IEEE Standards Terms. Dec. 2000. IEEE. p. 1113.*

Arpaci-Dusseau et al. Operating Systems: Three Easy Pieces. 2019. https://pages.cs.wisc.edu/~remzi/OSTEP/. https://pages.cs.wisc.edu/~remzi/OSTEP/vm-complete.pdf. p. 14.*

* cited by examiner

| | ConvIn, DW1 | PW1, DW2 | PW2 | ... | DW12, PW13 | AvgPool | ConvOut | Output |
|---|---|---|---|---|---|---|---|---|
| Layers | 2 | 2 | 1 | | 2 | - | 1 | - |
| Partition Size | (8,6,8,8) | (8,4,8,8) | (16,1,16,32) | ... | (2,2,8,16) | - | (1,1,16,32) | - |
| Partition Scheme | - | - | OR | | - | - | OR | - |

PROCESSING UNIT ARCHITECTURES AND TECHNIQUES FOR REUSABLE INSTRUCTIONS AND DATA

CROSS-REFERENCE TO RELATED APPLICATIONS

This Application is a continuation of PCT Patent Application No. PCT/US2021/047220 filed Aug. 23, 2021, and claims the benefit of U.S. Provisional Patent Application No. 63/068,950 filed Aug. 21, 2020, which are incorporated herein in their entirety.

BACKGROUND OF THE INVENTION

Referring to FIG. 1, a conventional computing system is shown. Conventional computing systems include a processing unit fabricated on an integrated circuit (IC) chip 110 and one or more off-chip memories 120. The processing unit IC chip 110 can typically be a central processing unit (CPU), graphics processing unit (GPU), tensor processing unit (TPU), artificial intelligence (AI) accelerator or the like. As used herein, off-chip memory 120 refers to memory that is not fabricated on the processing unit IC chip 110. The processing unit IC chip 110 includes compute circuitry 130 and on-chip memory 140. The compute circuitry 130 is configured to perform operations on data (e.g., operands) in accordance with instructions (e.g., software, configuration and control signals). The data and instructions are stored in the off-chip memory 120. The instructions and data are read in from the off-chip memory 120 for execution by the compute circuitry 130 and then result data can be written back out to the off-chip memory 120 The on-chip memory 140 is configured to cache the data and instructions read in from the off-chip memory 120 for use by the compute circuitry 130 and to cache result data written out from the compute circuitry 130 to the off-chip memory 120. As used herein the term cache refers to memory that provides limit amount of short-term storage of data and instructions for use by the compute circuitry 130 of the processing unit IC chip 110.

The off-chip memory 120 of the conventional compute system however limits memory bandwidth performance and dominates power consumption. The repeated reading in data and instructions in from the off-chip memory 120 and writing result data back to the off-chip memory 120 results in memory bandwidth utilization and substantial power consumption. Accordingly, there is a continuing need for improved computing systems.

SUMMARY OF THE INVENTION

The present technology may best be understood by referring to the following description and accompanying drawings that are used to illustrate embodiments of the present technology directed toward processing unit architectures and techniques for reusable instructions and data.

In one embodiment, a processing unit integrated circuit (IC) chip can include an on-chip compute circuitry, a first on-chip memory and a second on-chip memory. The first on-chip memory can be configured to store reusable data and instructions, and the second on-chip volatile memory configured to cache data and instructions stored in off-chip memory.

In another embodiment, a computing system can include a processing unit integrated circuit (IC) chip and an off-chip memory. The processing unit IC chip can include an on-chip compute circuitry, a first on-chip memory and a second on-chip memory. The first on-chip memory can be configured to store reusable data and instructions processing unit IC chip. The second on-chip volatile memory configured to cache data and instructions stored in off-chip memory for use by the processing unit IC chip.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
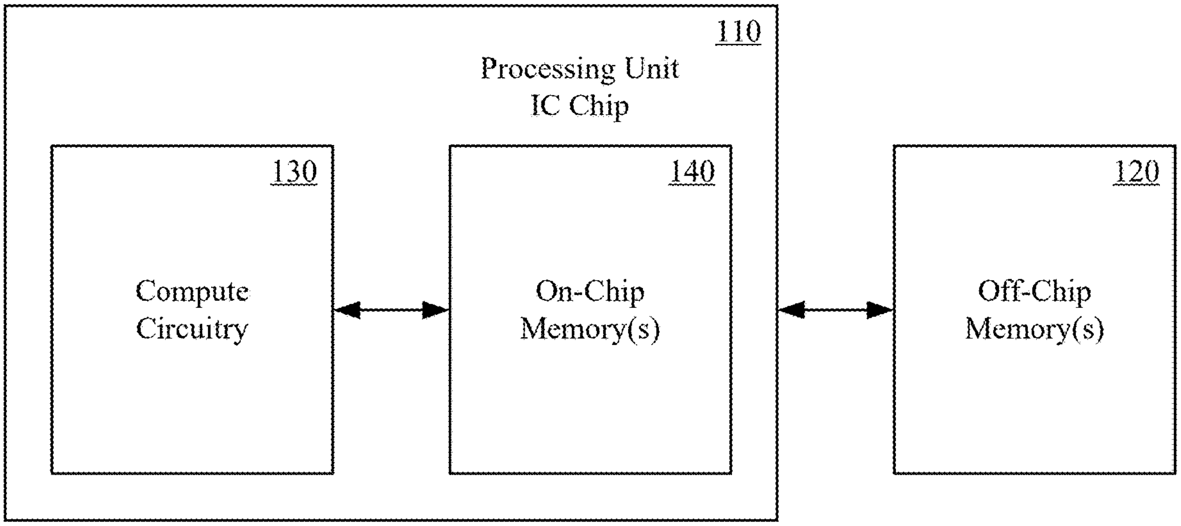
FIG. 1 (Conventional Art)
FIG. 1 shows a conventional computing system.

Reference will now be made in detail to the embodiments of the present technology, examples of which are illustrated in the accompanying drawings. While the present technology will be described in conjunction with these embodiments, it will be understood that they are not intended to limit the technology to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. The use of the terms "comprises," "comprising," "includes," "including" and the like specify the presence of stated elements, but do not preclude the presence or addition of one or more other elements and or groups thereof. It is also to be understood that although the terms first, second, etc. may be used herein to describe various elements, such elements should not be limited by these terms. These terms are used herein to distinguish one element from another. For example, a first element could be termed a second element, and similarly a second element could be termed a first element, without departing from the scope of embodiments. It is also to be understood that when an element is referred to as being "coupled" to another element, it may be directly or indirectly connected to the other element, or an intervening element may be present. In contrast, when an element is referred to as being "directly connected" to another element, there are not intervening elements present. It is also to be understood that the term "and or" includes any and all combinations of one or more of the associated elements. It is also to be understood that the phraseology and terminology used herein is for the purpose of description and should not be regarded as limiting.

Figure 2:
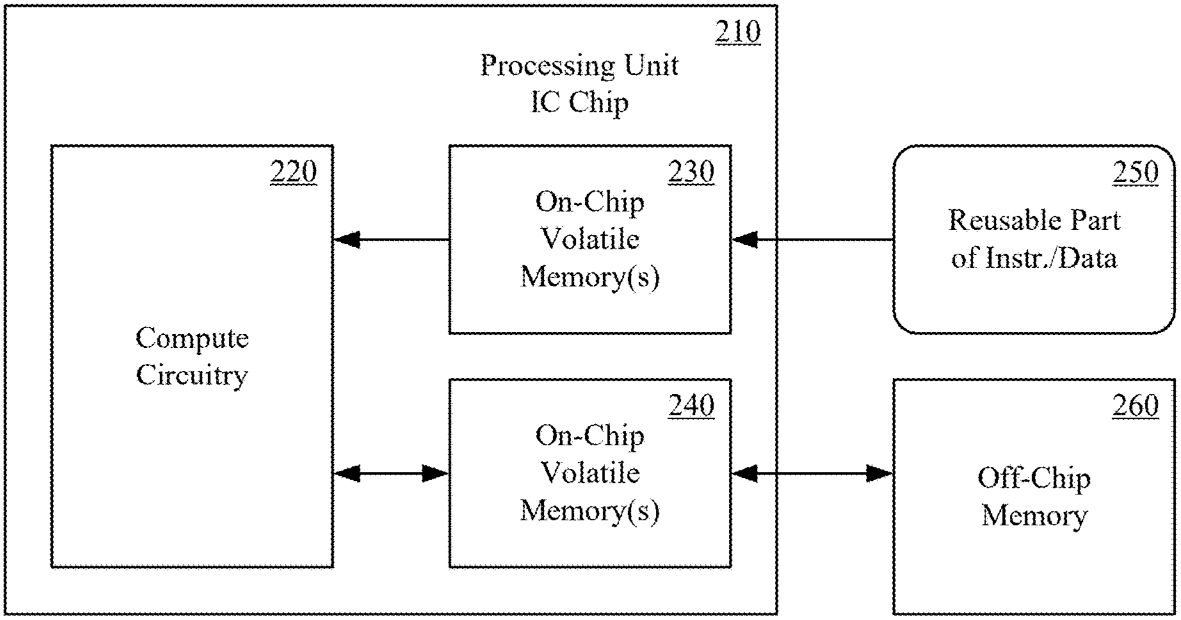
FIG. 2 shows a processing unit integrated circuit (IC) chip, in accordance with aspects of the present technology.

Referring now to FIG. 2, a processing unit integrated circuit (IC) chip, in accordance with aspects of the present technology, is shown. The processing unit (IC) chip 210 can include on-chip compute circuitry 220, a first on-chip memory 230 and a second on-chip memory 240. As used herein, on-chip memory refers to memory that is fabricated on the processing unit IC chip 210, and off-chip memory refers to memory that is not fabricated on the processing unit IC chip 210. Again, the processing unit IC chip 110 can be a central processing unit (CPU), graphics processing unit (GPU), tensor processing unit (TPU), artificial intelligence (AI) accelerator or the like. The compute circuitry 130 can be configured to perform operations on data (e.g., operands) in accordance with instructions (e.g., software, configuration and control signals). The first on-chip memory 230 can be configured to store reusable data and instructions 250. The second on-chip memory 240 can be configured to cache data and instructions stored in off-chip memory 260. As used herein the term cache with reference to on-chip memory refers to memory that provides limited amount of short-term storage of data and instructions for use by the compute circuitry 230, while the term storage with reference to on-chip memory refers to memory that provide limited amount of long-term storage of data and instructions that are reused by the compute circuitry 230. In one implementation, the first and second on-chip memories 230, 240 can be volatile memory, such as but not limited to static random-access memory (SRAM). Storing data and instructions that are reused in the first on-chip memory reduces the need to reload data and instruction from off-chip memory 260 frequently. The use of the first on-chip memory 230 for storage of reusable data and instructions advantageously reduces memory access to the off-chip memory 260, thereby reducing power and memory bandwidth utilization. However, the first on-chip memory 230 still consumes power during operation when memory such as SRAM is used.

Figure 3:
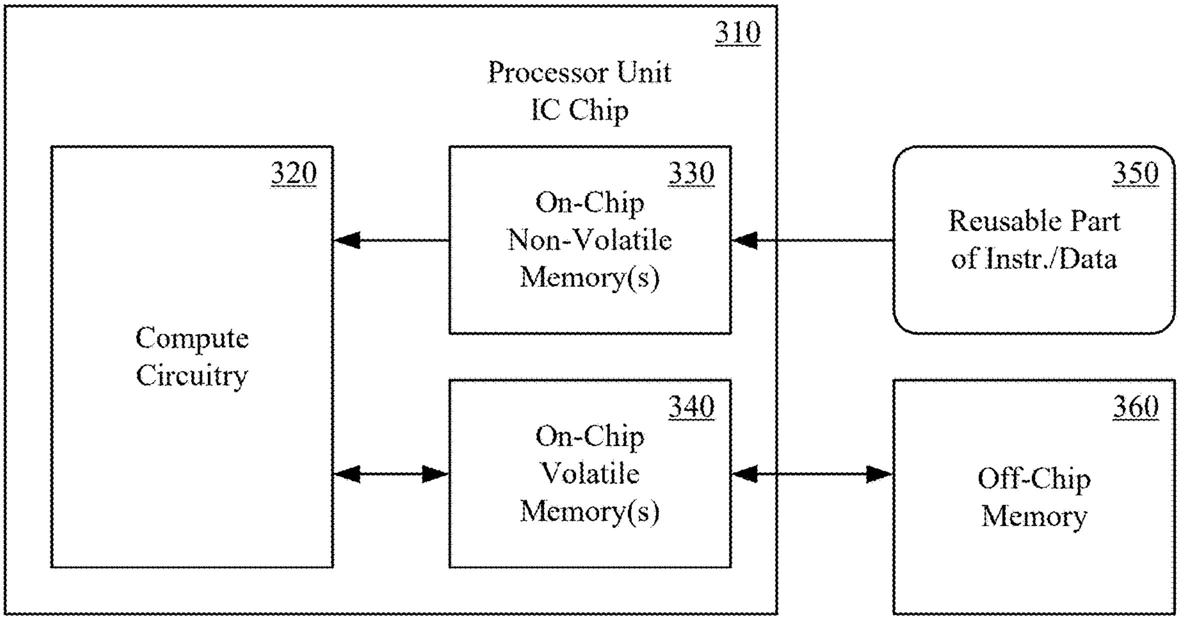
FIG. 3 shows a processing unit integrated circuit (IC) chip, in accordance with aspects of the present technology.

Referring now to FIG. 3, a processing unit integrated circuit (IC) chip, in accordance with aspects of the present technology, is shown. The processing unit (IC) chip 310 can include on-chip compute circuitry 320, a first on-chip memory 330 and a second on-chip memory 340. As used herein, on-chip memory refers to memory that is fabricated on the processing unit IC chip 310, and off-chip memory refers to memory that is not fabricated on the processing unit IC chip 310. Again, the processing unit IC chip 310 can be a central processing unit (CPU), graphics processing unit (GPU), tensor processing unit (TPU), artificial intelligence (AI) accelerator or the like. The compute circuitry 330 can be configured to perform operations on data (e.g., operands) in accordance with instructions (e.g., software, configuration and control signals). The first on-chip memory 330 can be configured to store reusable data and instructions 350. The second on-chip memory 340 can be configured to cache data and instructions stored in off-chip memory 360. As used herein the term cache with reference to on-chip memory refers to memory that provides limited amount of short-term storage of data and instructions for use by the compute circuitry 330, while the term storage with reference to on-chip memory refers to memory that provide limited amount of long-term storage of data and instructions that are reused by the compute circuitry 330. In one implementation, the first and second on-chip memories 330, 340 can be non-volatile memory, such as but not limited to flash memory, resistive random-access memory (RRAM), and magnetoresistive random-access memory (MRAM). Storing data and instructions that are reused in the first on-chip memory reduces the need to reload data and instruction from off-chip memory 360 frequently. The use of the first on-chip memory 330 for storage of reusable data and instructions advantageously reduces memory access to the off-chip memory 360, thereby reducing power and memory bandwidth utilization. Furthermore, the first on-chip memory 330 does not consume power during operation when memory such as flash memory, RRAM, or MRAM is not being accessed. Therefore, power consumption is further reduces as compared to volatile type memory such as SRAM used for the first on-chip memory. The use of non-volatile memory such as flash memory also enables re-programming of the data and or instructions stored in the first on-chip memory 330 as needed.

Figure 4:
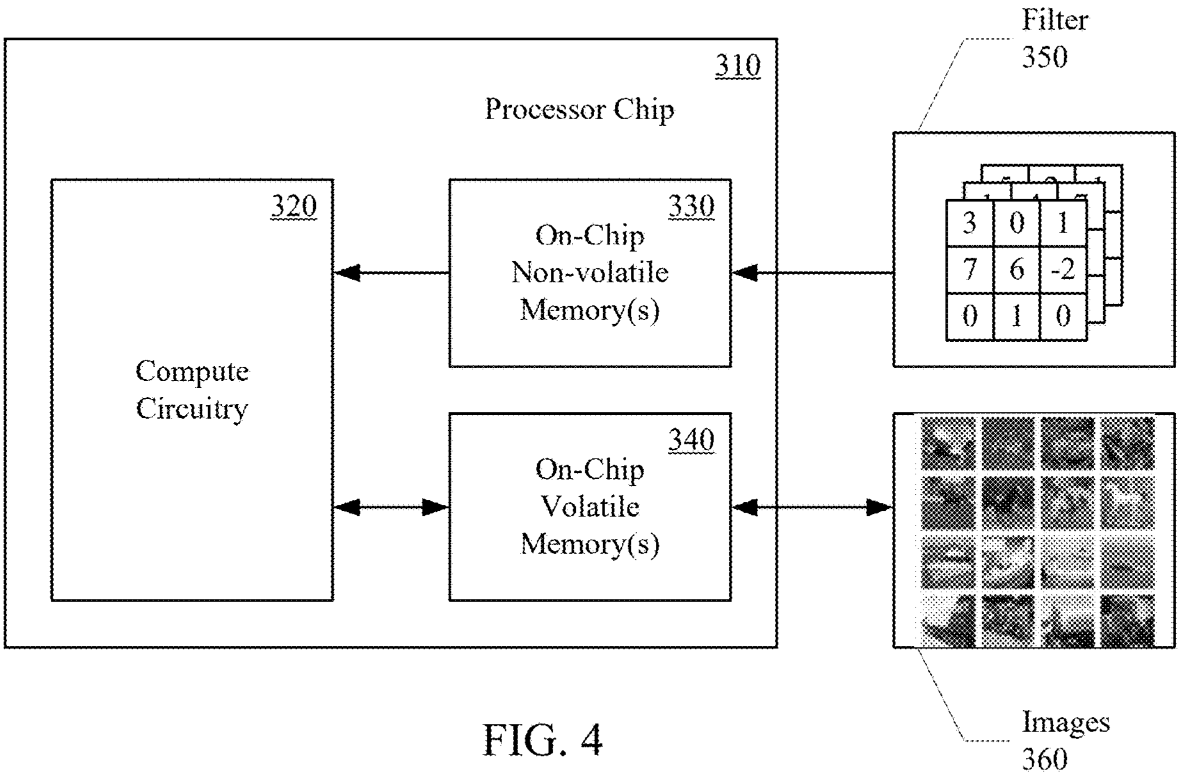
FIG. 4 illustrates an exemplary implementation of the conventional computing system, in accordance with aspects of the present technology.

Referring now to FIG. 4, an exemplary implementation of the conventional computing system, in accordance with aspects of the present technology, is illustrated. In one implementation, the compute circuitry 320 can be configured to execute an artificial intelligence model of an image recognition application. The first on-chip memory 330 of the processing unit IC chip 310 can be configured to store one or more filters (e.g., weights) 355 for the image recognition application. Input images 365 stored in the off-chip memory 360 can be read into and cached by the second on-chip memory for use by the compute circuitry 320. The one or more filters stored in the first on-chip memory 330 is reused by the compute circuitry 320 to process the input images by the image recognition application. In contrast, the images are not reused and therefore are cached in the second on-chip memory when read in from the off-chip memory.

Figure 5:
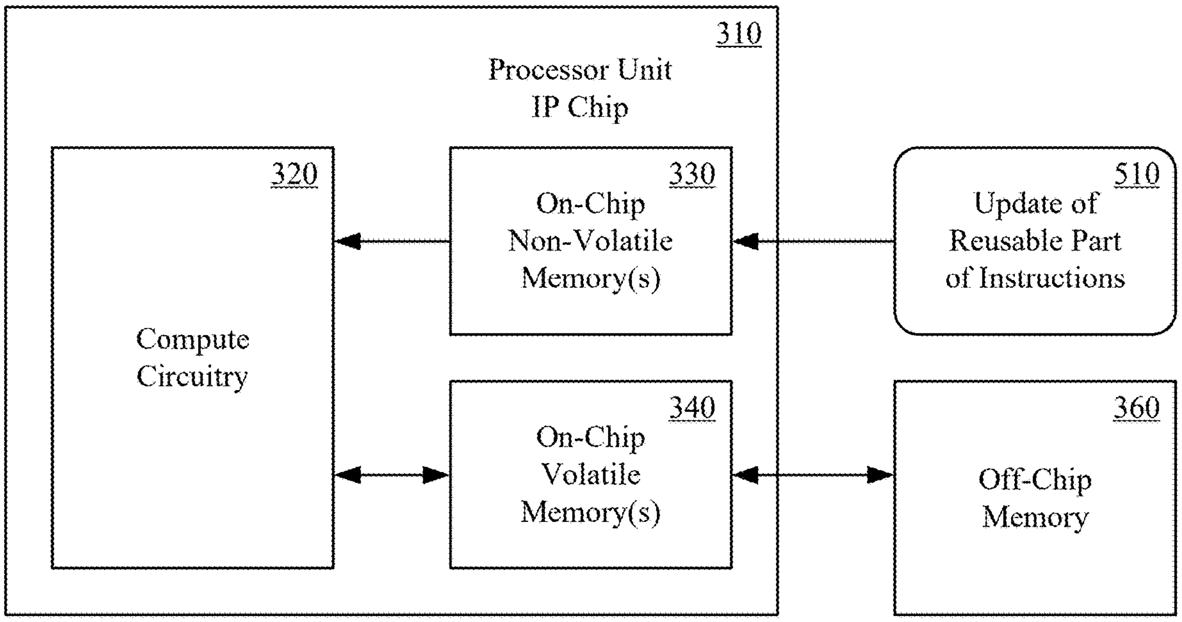
FIG. 5 illustrates an exemplary implementation of the conventional computing system, in accordance with aspects of the present technology.

Referring now to FIG. 5, an exemplary implementation of the conventional computing system, in accordance with aspects of the present technology, is illustrated. The first on-chip memory 330 of the processing unit IC chip 310 can be configured to store reusable instructions and or data. In one implementation, the non-volatile on-chip memory 330 can be configured to store instructions for one or more matrix operations. The matrix operation instructions stored in the first on-chip memory 330 is reused by the compute circuitry 320. However, the matrix operation instructions or portions thereof can be readily updated 510 by storing the updates in the first on-chip memory 330 as needed. In one implementation, the reusable instructions and or data, such as matrix operations for example, can be updated from the off-chip memory 360, a communication interface, or the like.

Figure 6:
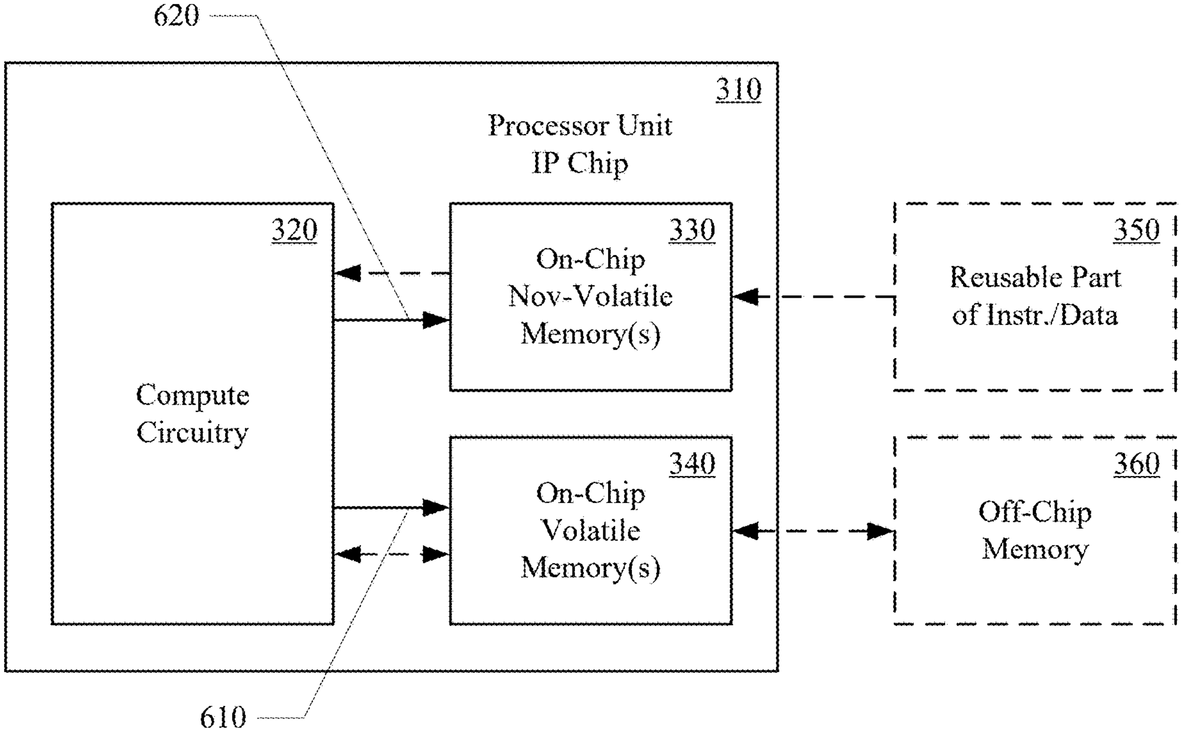
FIG. 6 illustrates an exemplary implementation of the conventional computing system, in accordance with aspects of the present technology.

Referring now to FIG. 6, an exemplary implementation of the conventional computing system, in accordance with aspects of the present technology, is illustrated. An application executing on the compute circuitry 320 of the processing unit IC chip 310 can generate interim results, outputs or the like data 610 during run-time. The interim results, output or the like data can be written from the compute circuitry 320 out for caching by the second on-chip memory 340. Alternatively or in addition, the application can generate run-time instructions 620. Similarly, run-time instruction which can be reused can be written from the compute circuitry 320 out for storage by the first on-chip memory 340. Store the run-time instructions in the first on-chip memory 330 can change the execution order, type, data-path configuration or like of the process performed by the set of instructions store in the first on-chip memory 330.

The first on-chip memory configured to store reusable data and instructions advantageously reduces off-chip data movement. Data and or instructions do not need to be reloaded from off-chip memory. The first on-chip memory also advantageously enables updating data and instructions stored therein.

Figure 7:
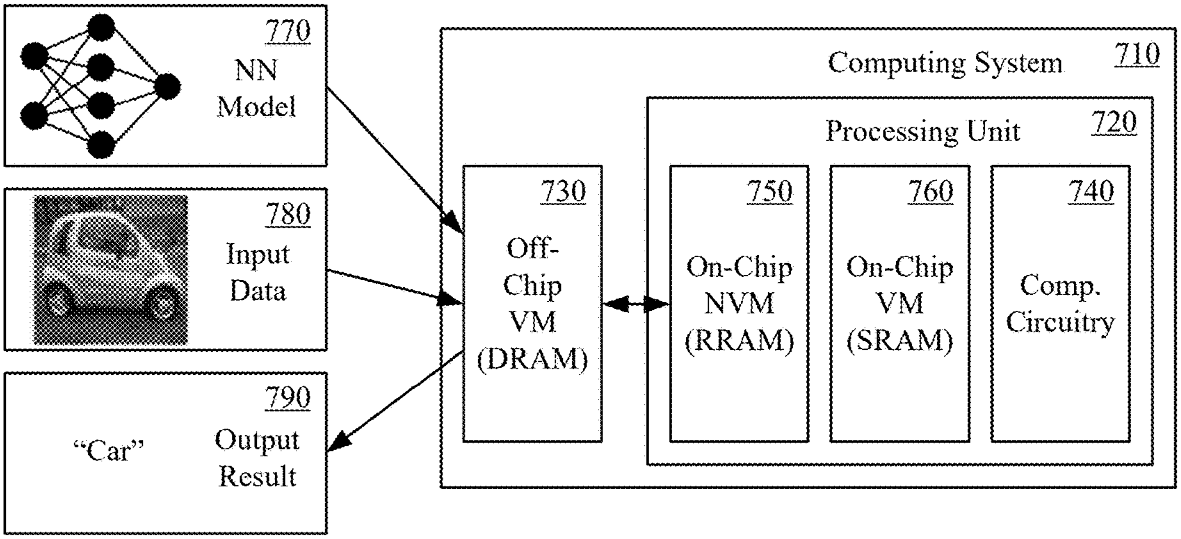
FIG. 7 shows a computing system, in accordance with aspects of the present technology.

In some instances, the reusable data and instructions of an application can fit into the first on-chip memory. However, in other instances there the first on-chip memory will not be large enough to store all of the reusable data and or instructions. For example, the weights of a neural network model can be very large and therefore cannot fit into the first on-chip memory. Therefore data allocation and memory mapping can be utilized to minimize accesses to external memory. Referring now to FIG. 7, a computing system, in accordance with aspects of the present technology, is shown. The computing system 710 can include a processing unit 720 and off-chip memory 730. In one implementation, the processing unit 720 can be a resistive processing unit (RPU), and the off-chip memory 730 can be dynamic random-access memory (DRAM). The processing unit 720 can include computation logic 740, a first on-chip memory 750 and a second on-chip memory 760. In one implementation, the first on-chip memory 750 can be non-volatile memory (NVM) such as resistive random access memory (RRAM), and the second on-chip memory 760 can be volatile memory (VM) such as static random access memory (SRAM). In one implementation, the processing unit 720 can execute instructions and data to implement an artificial intelligence application such as, but not limited to, an image recognition application. The artificial intelligence application can include a neural network model 770 for processing input data 780, such as images, and generate an output result 790, such as a probability or classification that each image contains a car. The off-chip memory 730, the first on-chip memory 750 and the second on-chip memory 760 can have a memory hierarchy and data allocation configuration to support artificial neural network (ANN) models with any number of layers, support any model size, and or support networks with branches.

The neural network model 770 can include a plurality of processing layers, and the input data 780 can include a plurality of channels of data. For example, the input data 780 can include a plurality of matrices corresponding to the pixel values of the plurality of color space channels of images. Each layer of the neural network model 770 applies weights to the input channels to generate feature maps as the output of the neural network model 770. The feature map outputs of a given neural network layer becomes the input channels to the next neural network layer. The weights of the neural network model 780 can be reused numerous time for processing feature maps.

Figure 8:
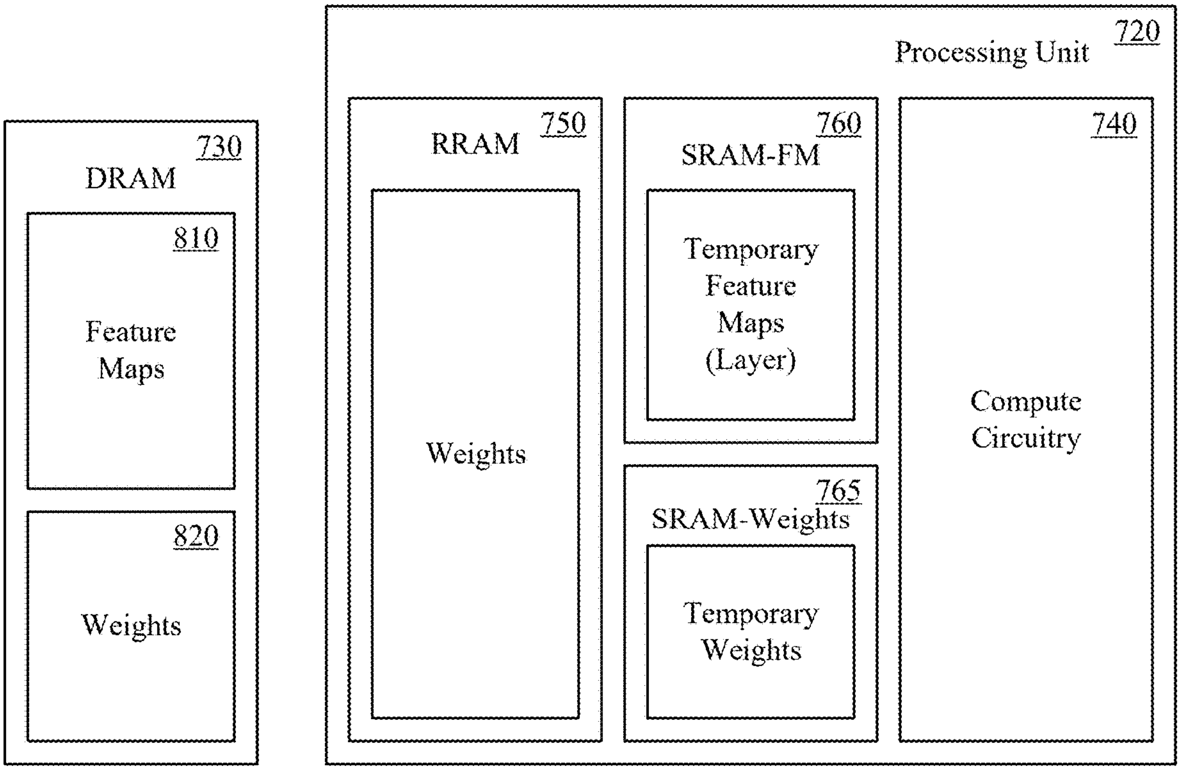
FIG. 8 shows a computing system, in accordance with aspects of the present technology.

Referring now to FIG. 8, a computing system, in accordance with aspects of the present technology, is shown. The computing system can include a processing unit integrated circuit chip 720 and off-chip memory 730. In one implementation, the processing unit 720 can be a resistive processing unit (RPU), and the off-chip memory 730 can be dynamic random-access memory (DRAM). The processing unit 720 can include on-chip computation logic 740, one or more first on-chip memories 750 and one or more second on-chip memories 760, 765. In one implementation, the first on-chip memory 750 can be resistive random access memory (RRAM), and the second on-chip memory 760, 765 can be static random-access memory (SRAM). The off-chip memory 730, the first on-chip memory 750 and the second on-chip memory 760, 765 can have a memory hierarchy and data allocation configuration to support artificial neural network (ANN) models with any number of layers, support any model size, and or support network with branches.

In one implementation, feature maps 810 and weights 820 for one or more neural network (NN) models 770 can be stored in the off-chip memory 730. The feature maps 810 and weights 820 can be allocated and mapped within the memory hierarchy of the computing system. In one implementation, the feature maps 810 can be allocated and mapped from the off-chip memory 730 such that given portions of feature maps 812 are allocated and mapped to volatile static random-access memory (SRAM) for processing (e.g., neural network inference) by the compute circuitry 740. At least a portion of the weights 820 can be allocated and mapped from the off-chip memory 730 to the first on-chip memory 750 and the second on-chip memory 765.

Figure 9A:
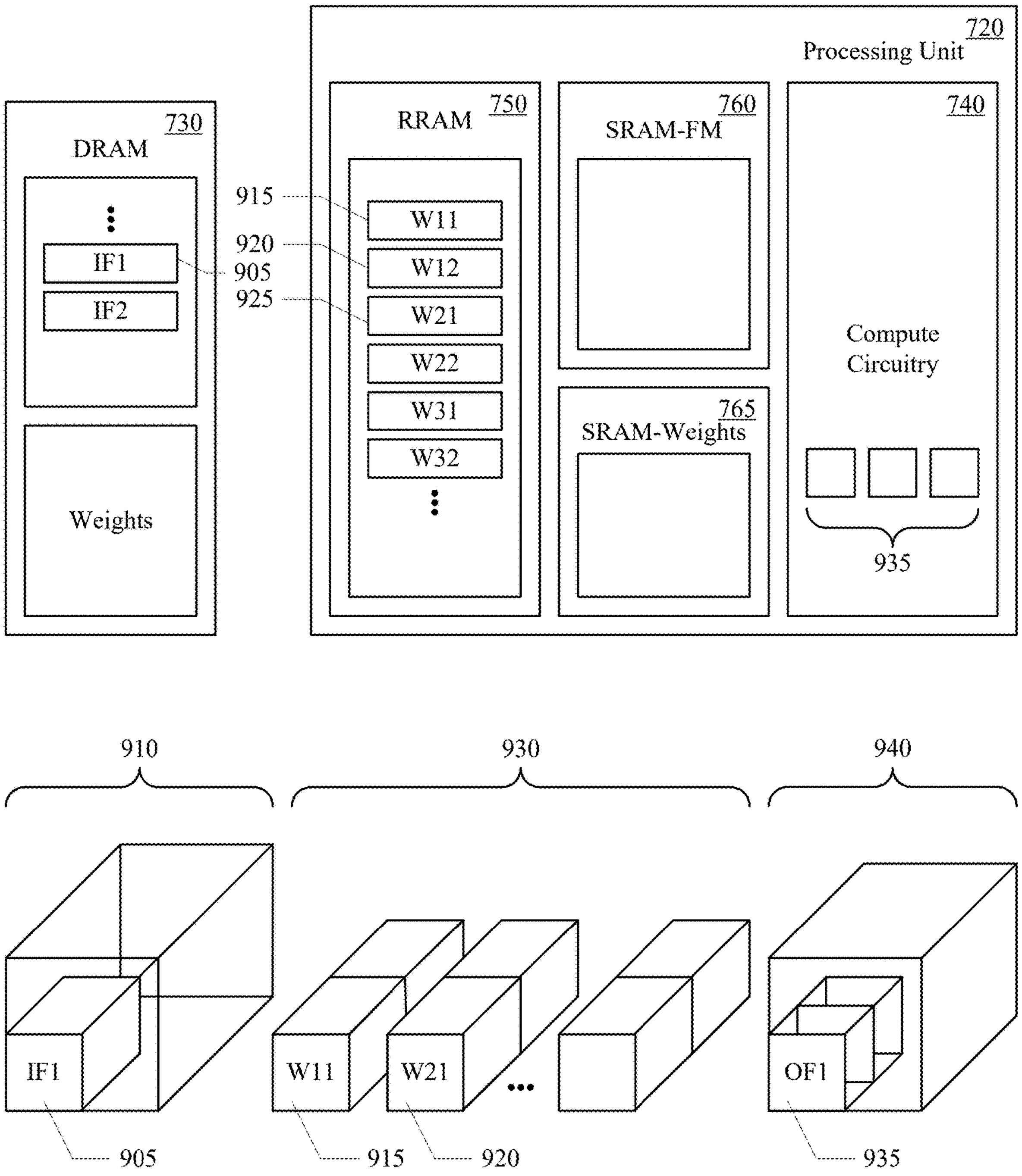
FIGS. 9A and 9B show data movement for neural network inference within the processing unit, in accordance with aspects of the present technology.
Figure 9B:
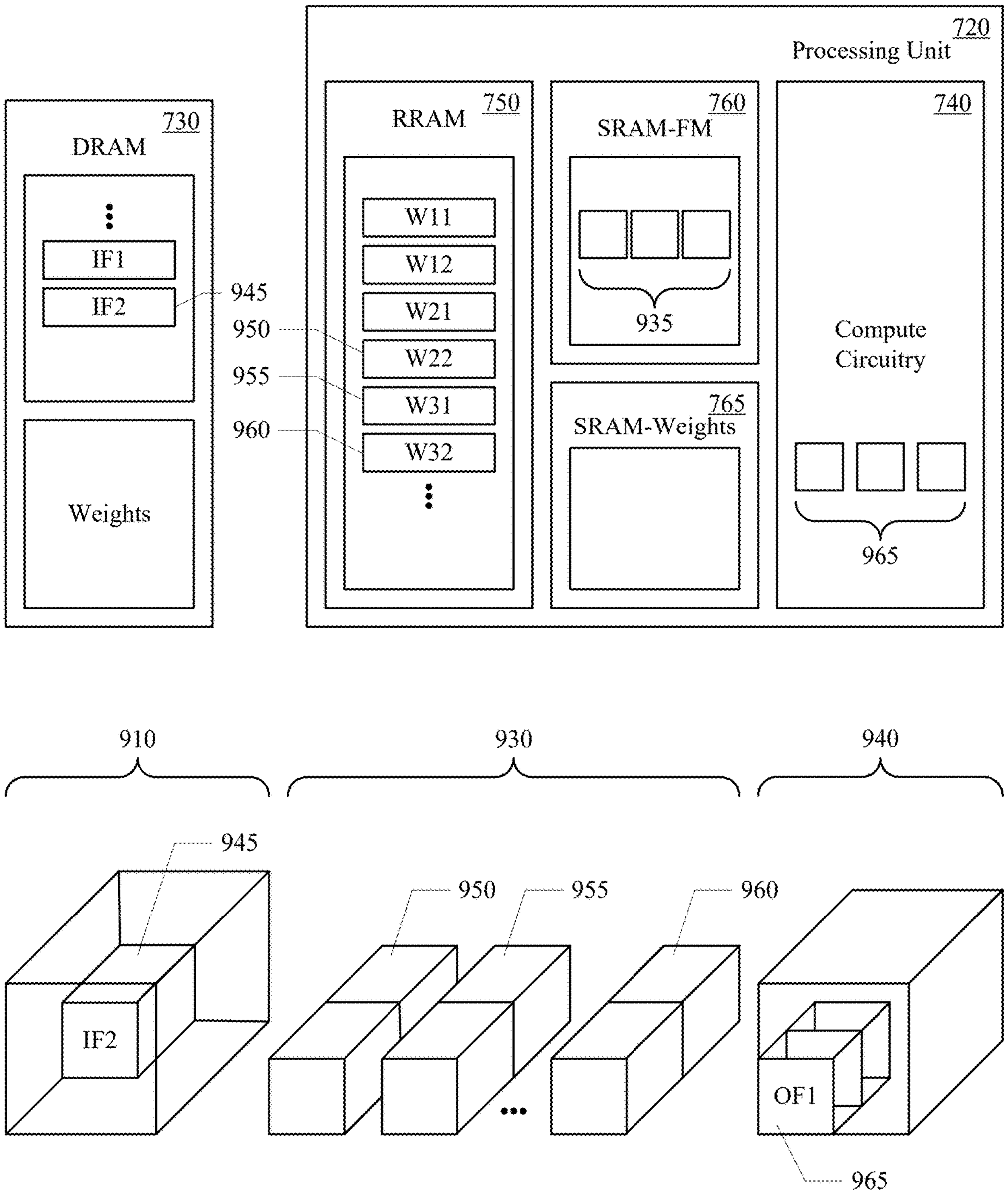

Referring now to FIGS. 9A and 9B, data movement for neural network inference within the processing unit 720, in accordance with aspects of the present technology, is shown. The data movement illustrates processing corresponding sections of input feature maps and weights to generate output feature maps. A first portion 905 of the input feature map 910, stored in off-chip memory 730, can be moved from off-chip memory 730 and cached in the second on-chip memory 760. Corresponding sections 915-925 of the weights 930 stored for reuse the first on-chip memory 750 can be moved and cached in the second on-chip memory 765. The first portion of the input feature map in the second on-chip memory 760 can then be convolved with corresponding sections 915-925 of the weights 930 for the plurality of channels, stored in the second on-chip memory 765, to generate corresponding partial sums 935 for the corresponding channels of the output feature map 940, as illustrated in FIG. 9A. The partial sum 935 for the corresponding channels of the output feature map 940 can be stored in the second memory 760. In a next pass, a second portion 945 of the input feature map 910, moved to the second on-chip memory 760, can be convolved with corresponding sections 950-960 of the weights 930 for the plurality of channels, moved into the second on-chip memory 765, to generate corresponding partial sums 965 for the corresponding channels of the output feature map 940. The partial sums 935, 965 for the corresponding channels can then be summed to generate the corresponding portion for the corresponding channels of the output feature map 940. The corresponding channels of the output feature map 940 can then be cached in the second on-chip memory 765 and thereafter stored in the off-chip memory 730.

Figure 10:
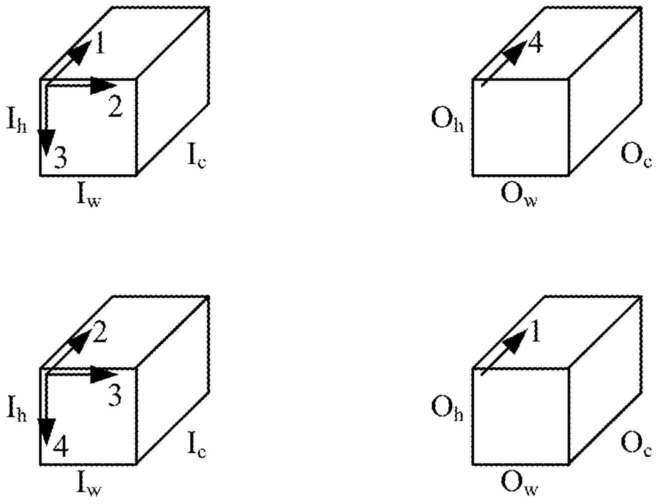
FIG. 10 illustrates factors affecting external memory access, in accordance with aspects of the present technology.
Figure 11:
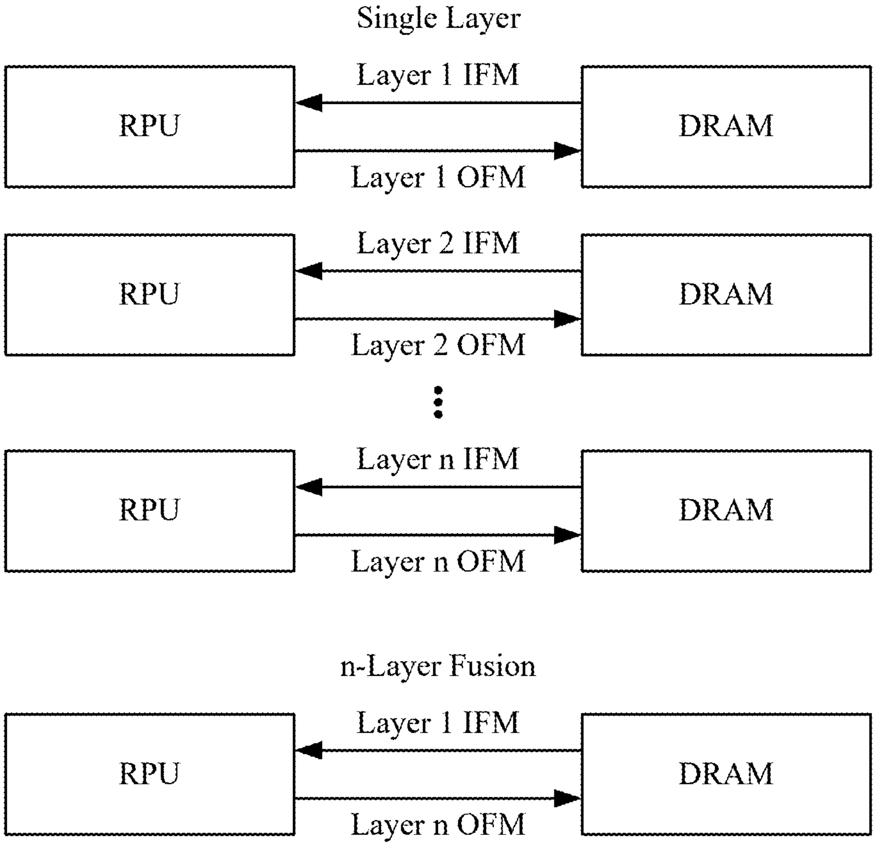
FIG. 11 illustrates factors affecting external memory access, in accordance with aspects of the present technology.
Figure 12:
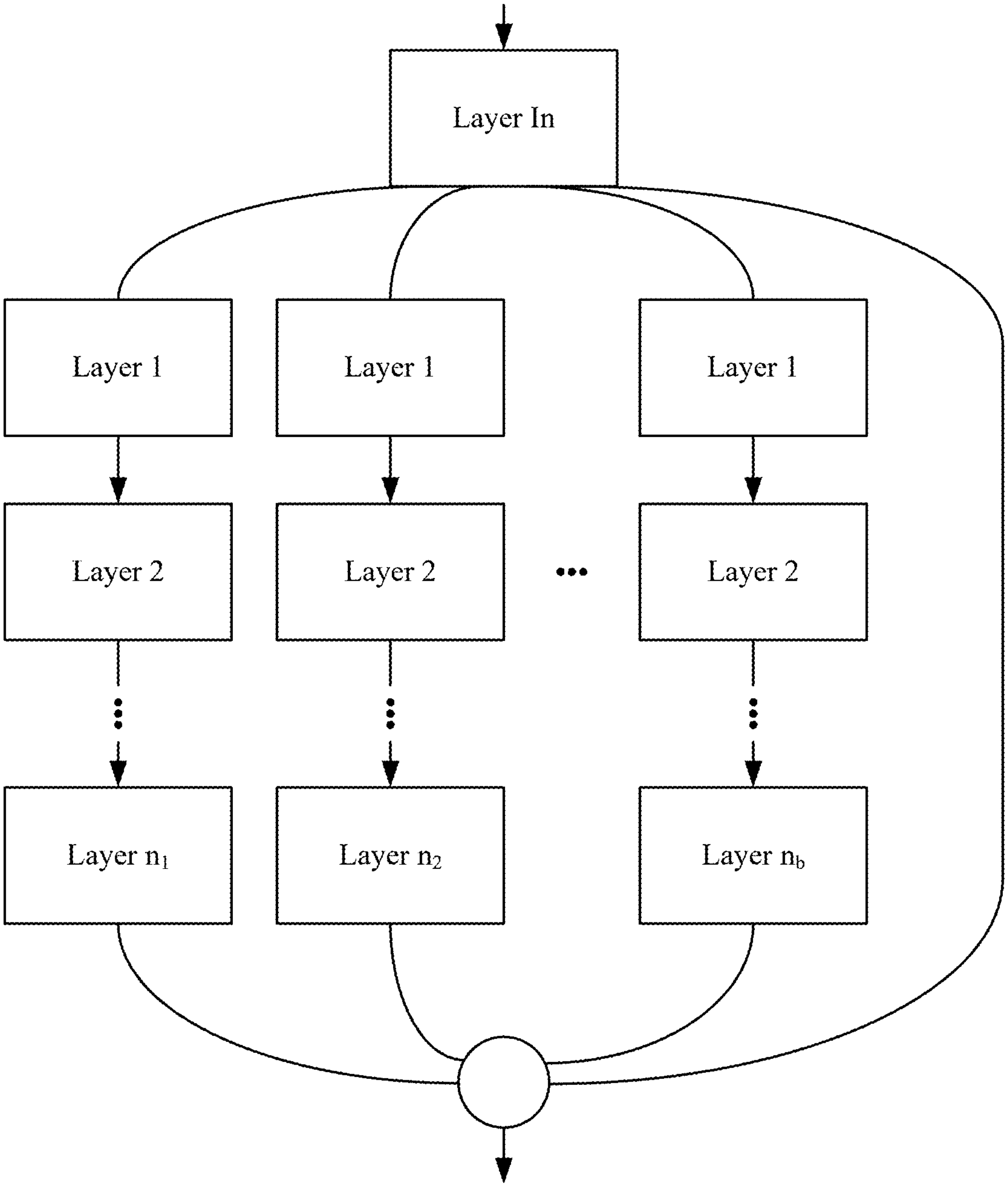
FIG. 12 illustrates factors affecting external memory access, in accordance with aspects of the present technology.
Figure 13:
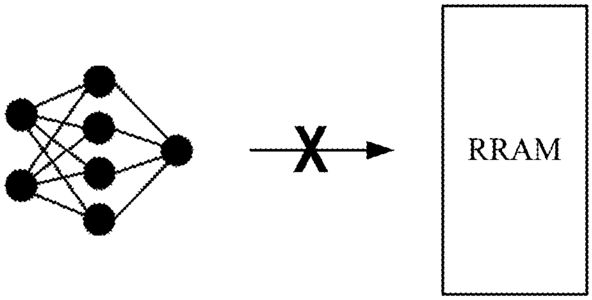
FIG. 13 illustrates factors affecting external memory access, in accordance with aspects of the present technology.

Referring now to FIGS. 10-13, factors affecting external memory access, in accordance with aspects of the present technology, are illustrated. External memory access can be affected by the computational order 1, 2, 3, 4 and partition scheme Ih, Iw, Ic, Oh, Ow, Oc, as illustrated in FIG. 10. Similarly, layer fusion can affect external memory access, as illustrated in FIG. 11. Skip-connection can also affect external memory access, as illustrated in FIG. 12. Weight storage can also affect external memory access when the size of the neural network model is larger than the first on-chip memory storage, such as resistive random access memory (RRAM), as illustrated in FIG. 13.

Figure 14:
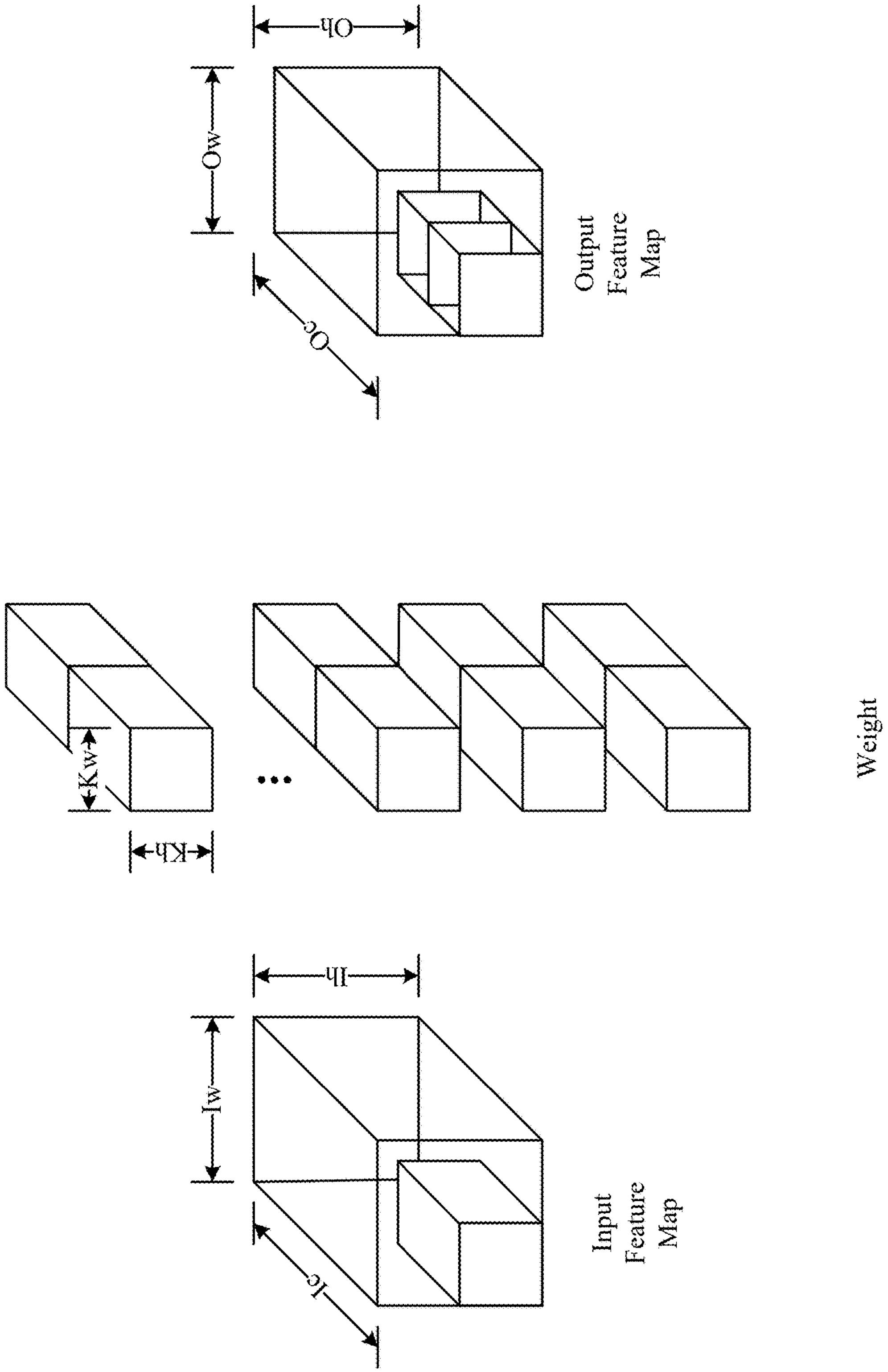
FIG. 14 illustrates parameters for an unpartitioned neural network model, in accordance with aspects of the present technology.
Figure 15:
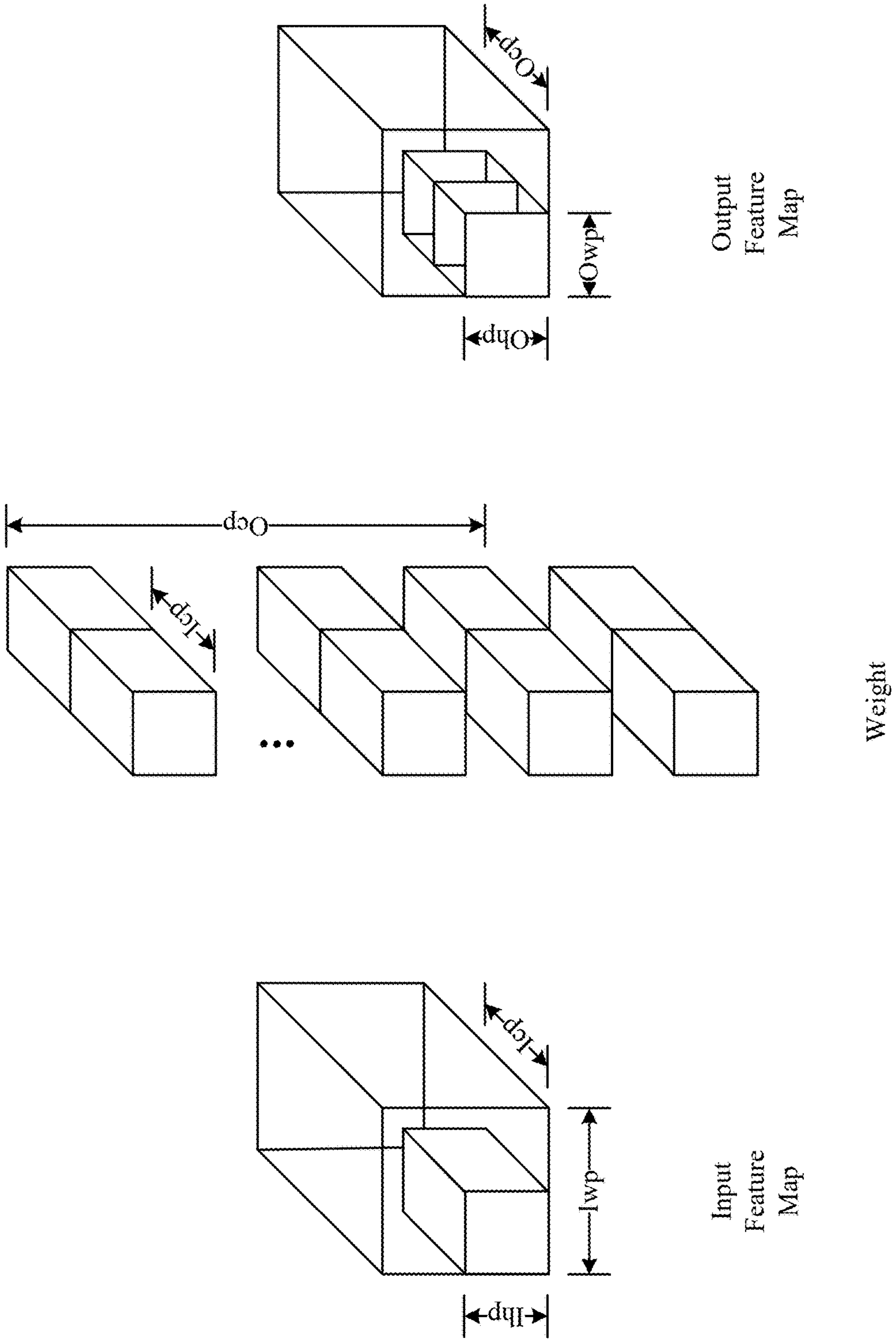
FIG. 15 illustrates parameters for a partitioned neural network model, in accordance with aspects of the present technology.

Referring now to FIG. 14, parameters for an unpartitioned neural network model, in accordance with aspects of the present technology, are illustrated. The input feature maps can be characterized by the unpartitioned parameters of input width (Iw), input height (Ih) and input channels (Ic). The weights can be characterized by the unpartitioned parameters of weight width (Kw) and weight height (Kh). The output feature maps can be characterized by the unpartitioned parameters of output width (Ow), output height (Oh) and output channels (Oc). Referring now to FIG. 15, parameters for a partitioned neural network model, in accordance with aspects of the present technology, are illustrated. The partitioned input feature maps can be further characterized by the partition input width (Iwp), partition input height (Ihp) and partition input channels (Icp) parameters. The partitioned weights can be further characterized by the partition input channels (Icp) and partition output channels (Ocp). The output feature maps can be characterized by the partition output width (Owp), partition output height (Ohp) and partition output channels (Ocp). Accordingly, the external memory access for the input feature map can be characterized in accordance with Equation 1:

$$EMA_{IFp} = Iwp \times Ihp \times Icp \tag{1}$$

If the weights are not reused from the first on-chip memory 750, the external memory access would be characterized in accordance with Equation 2:

$$EMAw_P = Kw \times Kh \times Icp \times Ocp \tag{2}$$

However, when the weights are saved in the first on-chip memory 750 for reuse, there is not external memory access.

The external memory access for the output feature map can be characterized in accordance with Equation 3:

$$EMA_{OFp} = Owp \times Ohp \times Ocp \tag{3}$$

Corresponding loading factors can be determined in accordance with Equations 4-7:

$$Nw = \left\lceil \frac{Iw}{Iwp} \right\rceil \tag{4}$$

$$Nh = \left\lceil \frac{Ih}{Ihp} \right\rceil \tag{5}$$

$$Ni = \left\lceil \frac{Ic}{Icp} \right\rceil \tag{6}$$

$$No = \left\lceil \frac{Oc}{Ocp} \right\rceil \tag{7}$$

Figure 16:
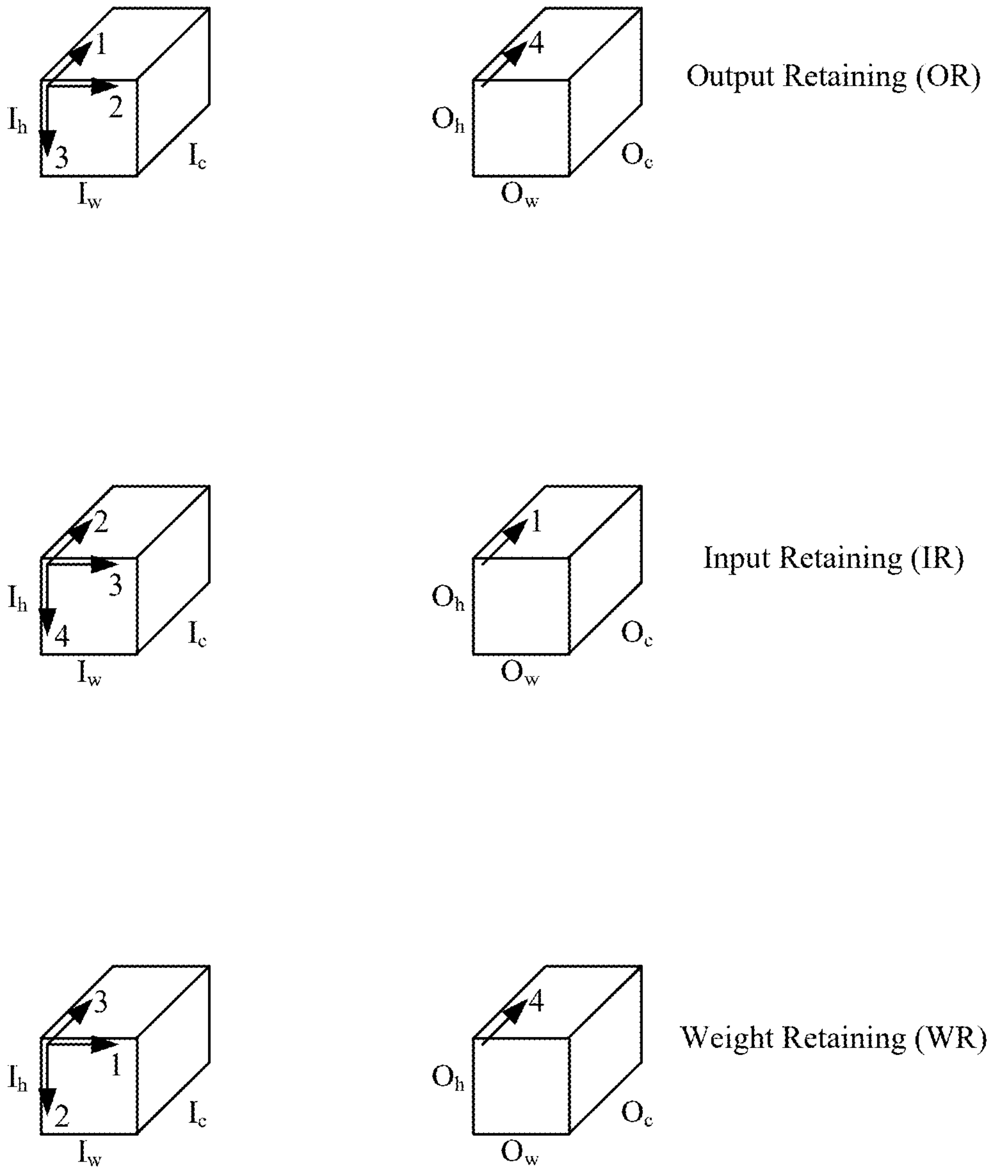
FIG. 16 illustrates external memory access for possible computation orders, in accordance with aspects of the present technology.
Figure 17A:
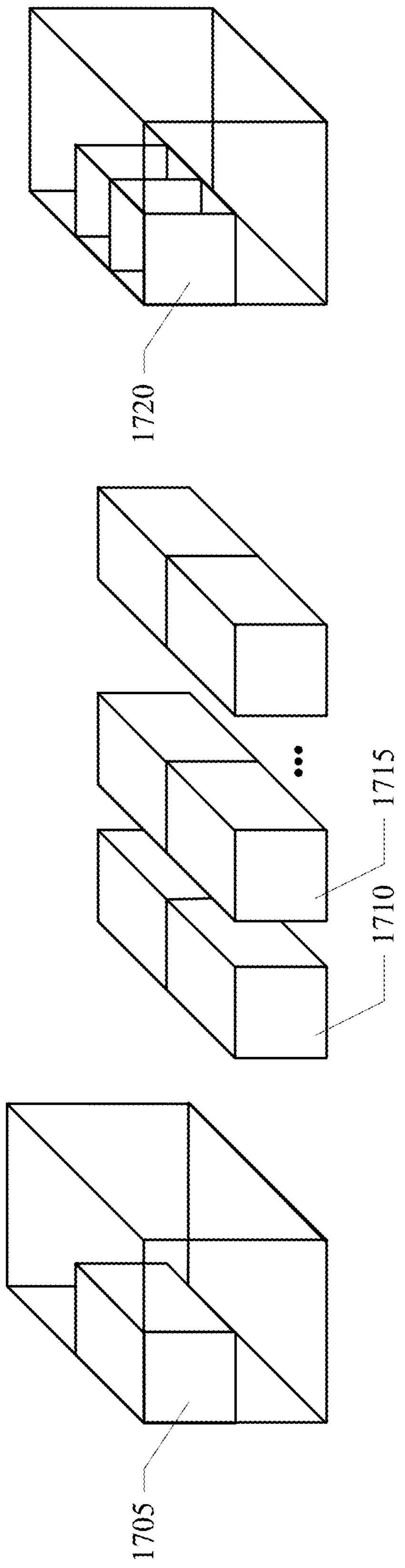
FIGS. 17A-17D illustrates output retaining external memory access, in accordance with aspects of the present technology.
Figure 17B:
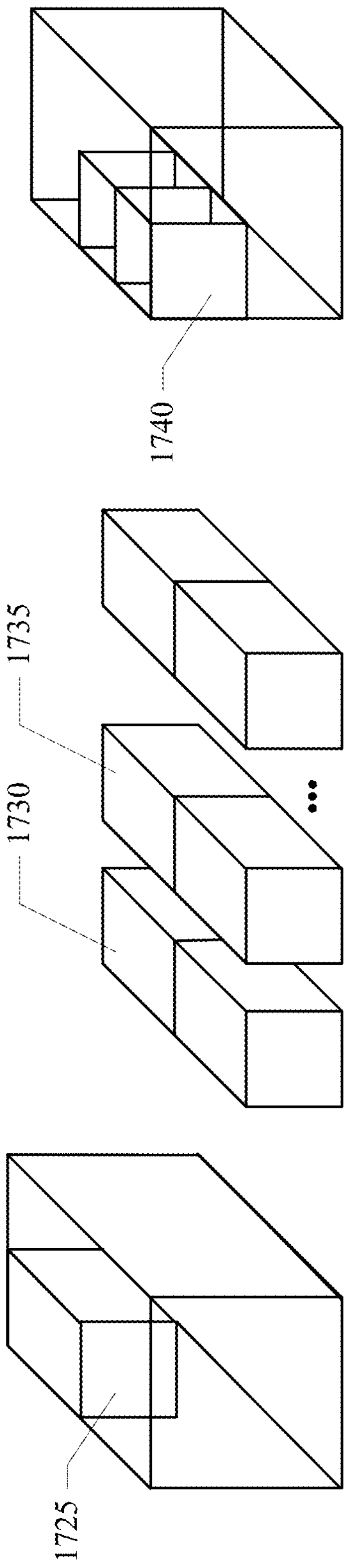
Figure 17C:
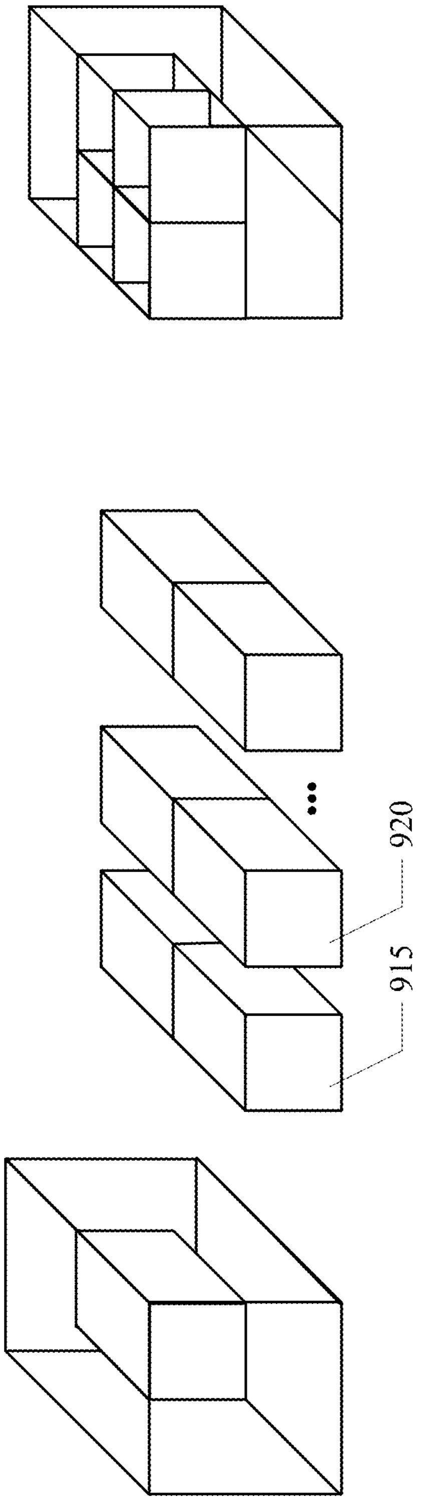
Figure 17D:
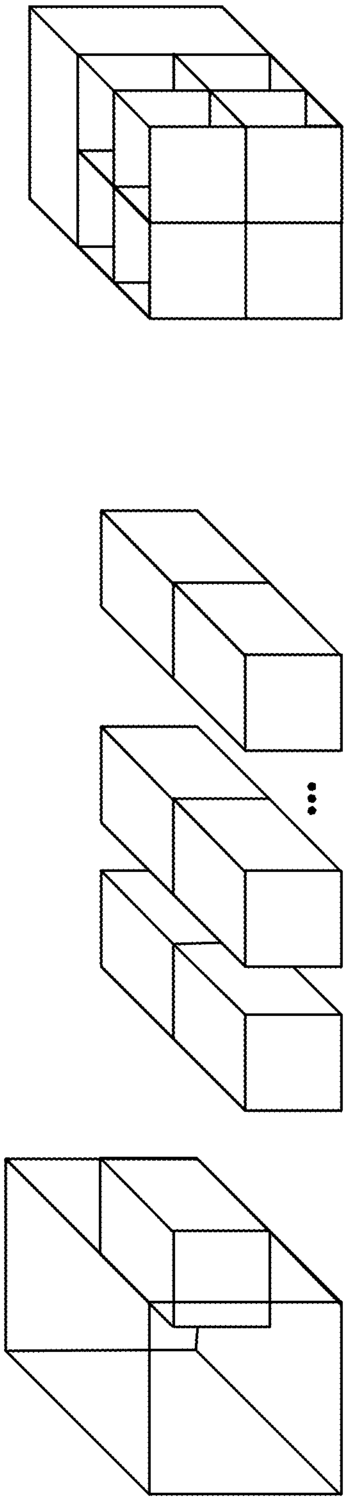

Referring now to FIG. 16, external memory access for possible computation orders, in accordance with aspects of the present technology, are illustrated. The possible computation orders can include output retaining, input retaining and weight retaining. Referring now to FIGS. 17A-17D, output retaining external memory access, in accordance with aspects of the present technology, is shown. The convolution of the input feature map and weights can begin with loading a first portion 1705 of the input feature map and corresponding first portions 1710, 1715 of the weights and computing a first partial sum 1720 of a first portion of the output feature map which can be retained in the on-chip memory, as illustrated in FIG. 17A. A second portion 1725 of the input feature map and corresponding second portion 1730, 1735 of the weights can be loaded for computing a second partial sum 1740 of the first portion of the output feature map which can be accumulated with the first partial sum of the first portion of the output feature map retained in the on-chip memory, as illustrated in FIG. 17B. A third portion of the input feature map and corresponding first portion of the weights can be loaded for computing a first partial sum of a second portion of the output feature map which can be retained in the on-chip memory, as illustrated in FIG. 17C. The processes can be continued until the last portion of the output feature map is computed, as illustrated in FIG. 17D. The output retaining external memory access can be characterized by Equation 8:

$$EMA_{OR} = [(EMA_{IFp} \times Ni) + EMA_{OFp}] \times Nw \times Nh \times No \tag{8}$$

Figure 18A:
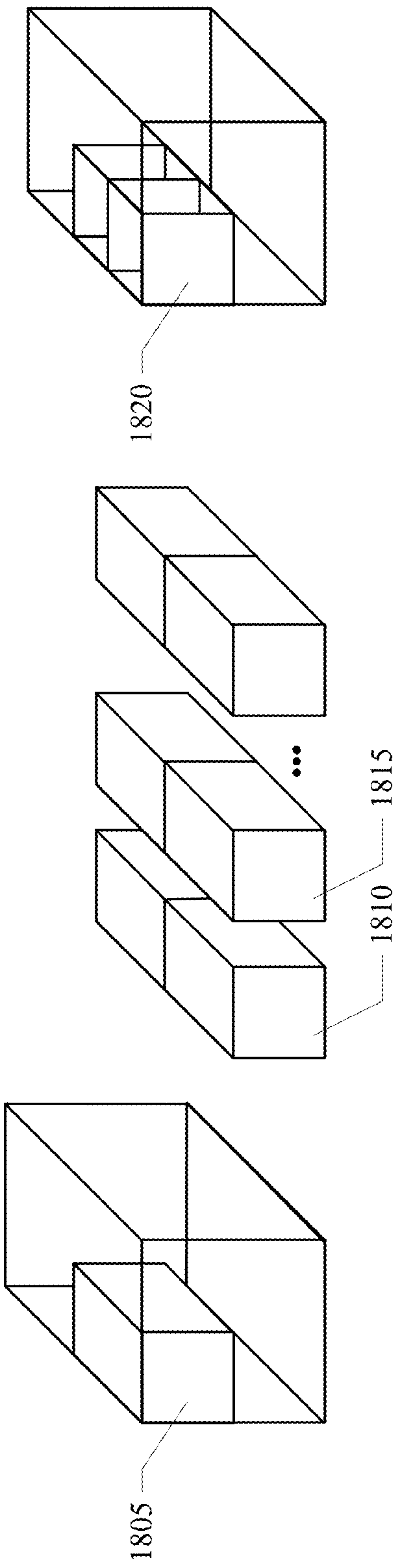
FIGS. 18A-18D illustrates input retaining external memory access, in accordance with aspects of the present technology.
Figure 18B:
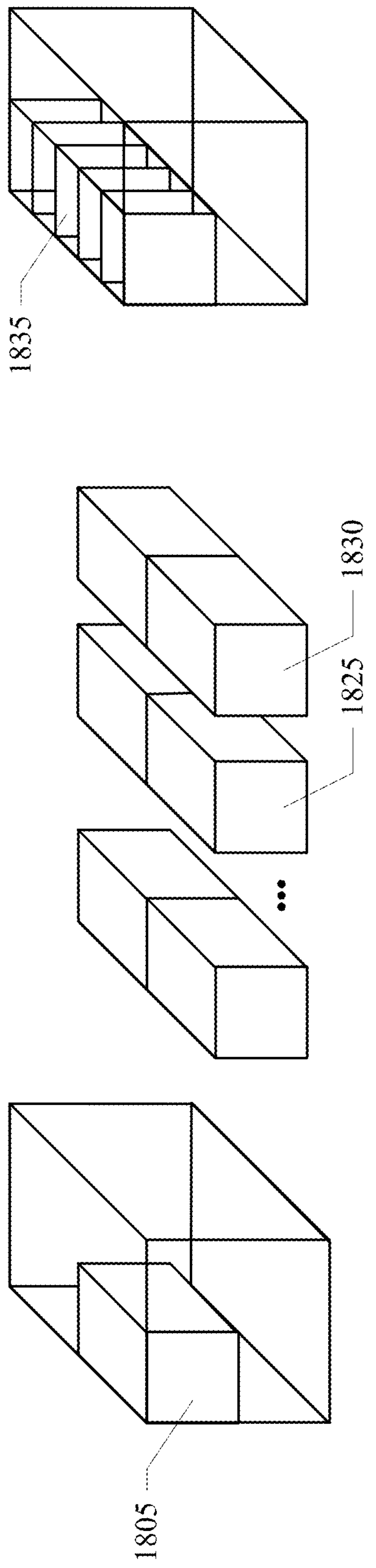
Figure 18C:
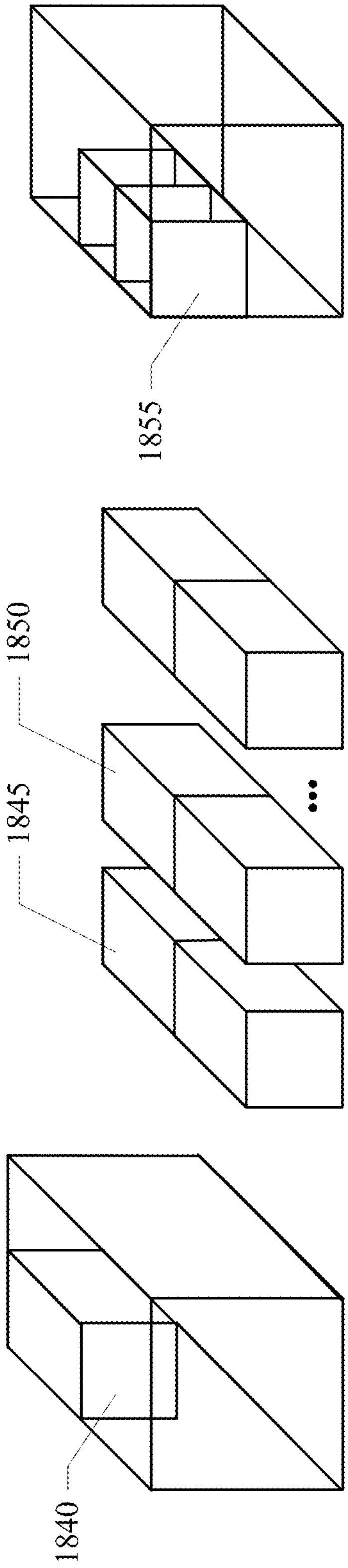
Figure 18D:
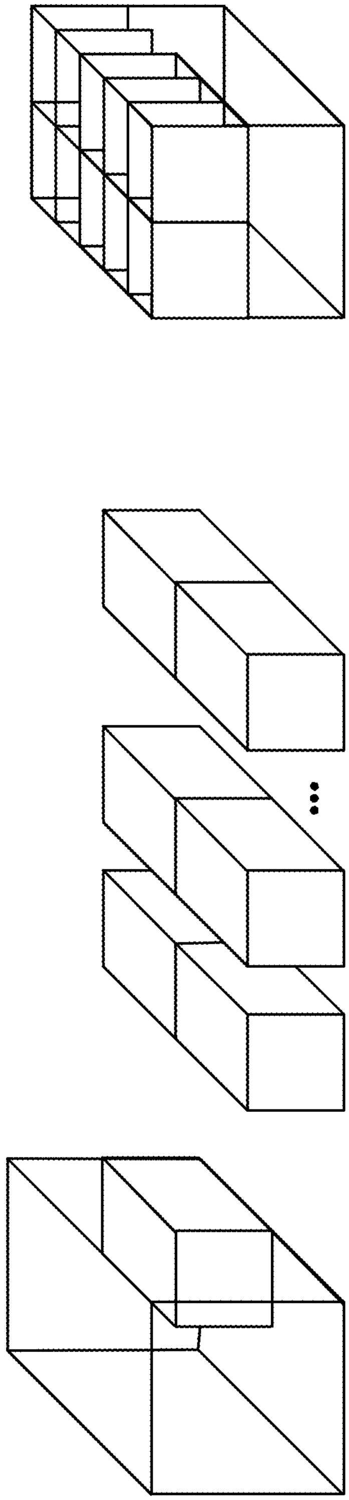

Referring now to FIGS. 18A-18D, input retaining external memory access, in accordance with aspects of the present technology, is shown. The convolution of the input feature map and weights can begin with loading a first portion 1805 of the input feature map and corresponding first portions 1810, 1815 of the weights and computing a first partial sum 1820 of a first portion of the output feature map, as illustrated in FIG. 18A. The first portion 1805 of the input feature map and additional corresponding first portion 1825, 1830 of the weights can be loaded for computing additional second partial sum 1835 of the first portion of the output feature map which can be accumulated with the first partial sum of the first portion of the output feature map retained in the on-chip memory, as illustrated in FIG. 18B. A second portion 1840 of the input feature map and corresponding second portions 1845, 1850 of the weights can be loaded for computing a second partial sum 1855 of the first portion of the output feature map which can be retained in the on-chip memory, as illustrated in FIG. 18C. The processes can be continued until the output feature map is computed, as illustrated in FIG. 18D. The input retaining external memory access can be characterized by Equation 9:

$$EMA_{IR} = [(2 \times EMA_{OFp} \times No) + EMA_{IFp}] \times Ni \times Nw \times Nh \tag{9}$$

Figure 19A:
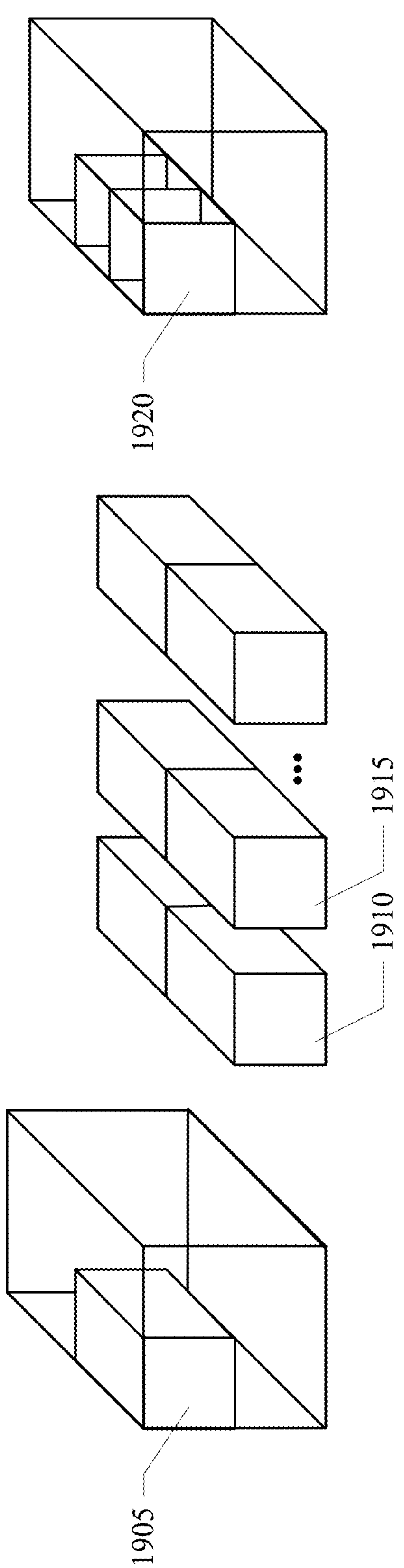
FIGS. 19A-19D illustrates weight retaining external memory access, in accordance with aspects of the present technology.
Figure 19B:
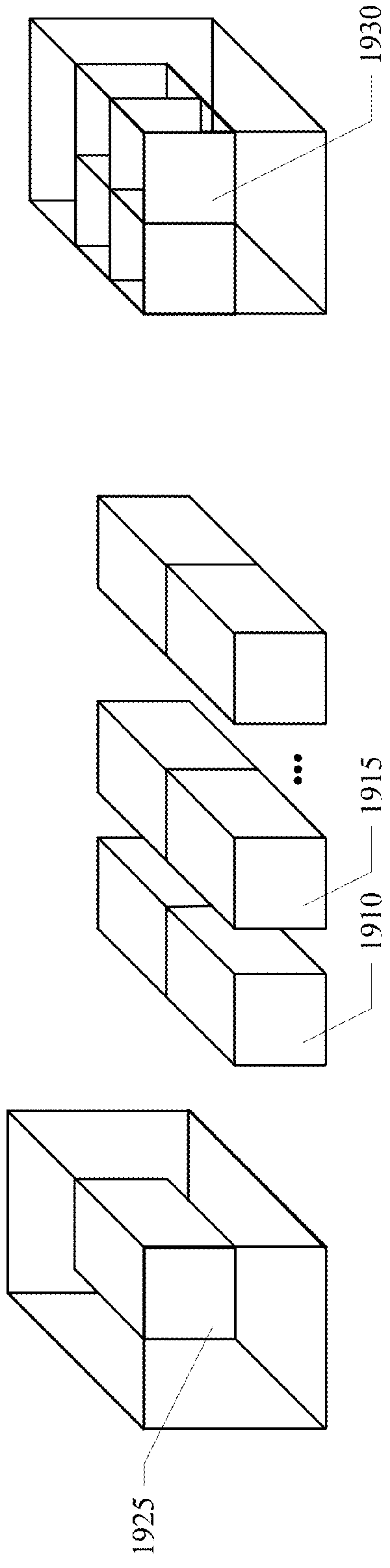
Figure 19C:
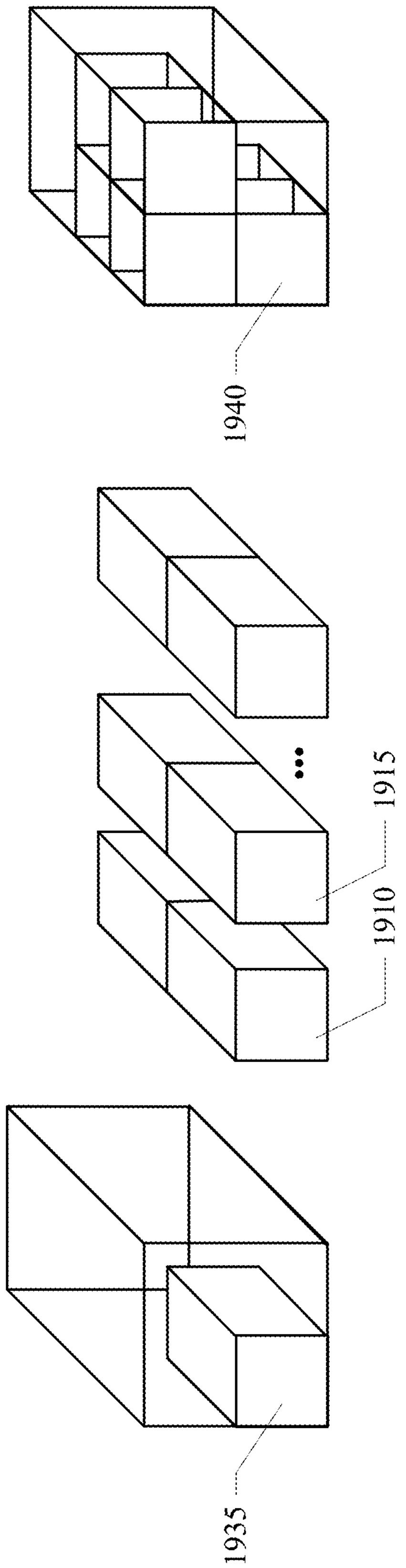
Figure 19D:
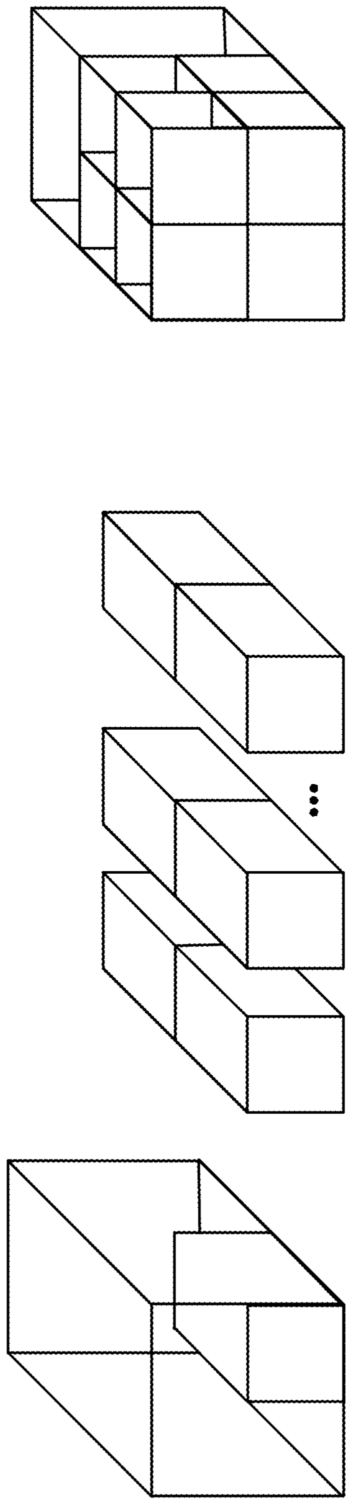

Referring now to FIGS. 19A-19D, weight retaining external memory access, in accordance with aspects of the present technology, is shown. The convolution of the input feature map and weights can begin with loading a first portion 1905 of the input feature map and corresponding first portions 1910, 1915 of the weights and computing a first partial sum 1920 of a first portion of the output feature map, as illustrated in FIG. 19A. Along with the corresponding first portion 1910, 1915 of the weights retained in the first on-chip memory, a second portion 1925 of the input feature map can be loaded for computing second partial sum 1930 of the first portion of the output feature map, as illustrated in FIG. 19B. Along with the corresponding first portion 1910, 1915 of the weights retained in the first on-chip memory, a third portion 1935 of the input feature map can be loaded for computing a third partial sum 1940 of the output feature map, as illustrated in FIG. 19C. The processes can be continued until the output feature map is computed, as illustrated in FIG. 19D. The input retaining external memory access can be characterized by Equation 10:

$$EMA_{WR} = [(EMA_{IFp} + 2 \times EMA_{OFp}] \times Nw \times Nh] \times Ni \times No \tag{10}$$

Figure 20:
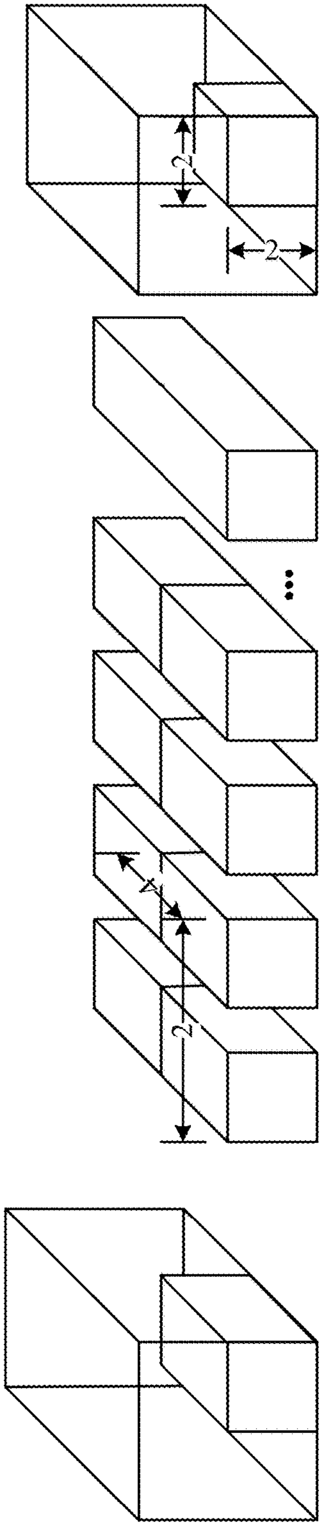
FIG. 20 illustrates a partition scheme with minimized external memory access, in accordance with aspects of the present technology.
Figure 21:
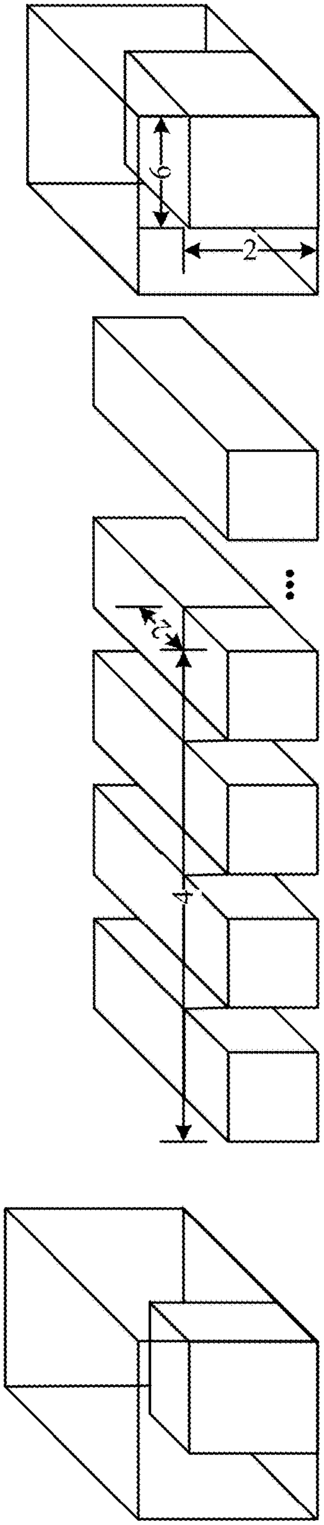
FIG. 21 illustrates a partition scheme with minimized external memory access, in accordance with aspects of the present technology.
Figure 22:
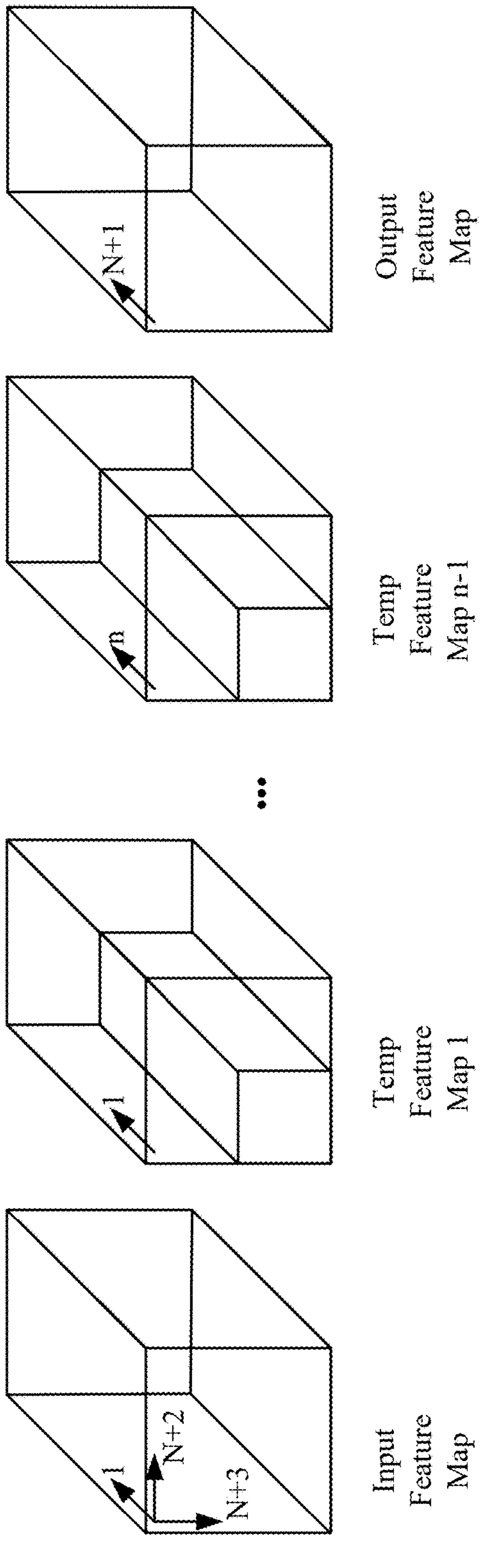
FIG. 22 shows extension to multiple-layer fusion, in accordance with aspects of the present technology.

Referring now to FIGS. 20 and 21, partition scheme with minimized external memory access, in accordance with aspects of the present technology, is shown. The best partition scheme that reaches a minimum external memory access can be determined under different computing orders by exhaustive search. The constraints can include feature map and weight size of the second on-chip memory, and the range of each partition axis. As illustrated in FIG. 20, the partition output height (Ohp), partition output width (Owp), partition input channel (Icp) and partition output channel (Ocp) can be (4, 4, 4, 2). As illustrated in FIG. 21, the partition output height (Ohp), partition output width (Owp), partition input channel (Icp) and partition output channel (Ocp) can be (6, 6, 2, 4). Referring now to FIG. 22, extension to multiple-layer fusion, in accordance with aspects of the present technology, is shown. The external memory access can be characterized according to Equation 11:

$$EMA_l^n = (EMA_{IFp} + Ni1 + EMA_{OFp} \times Non) \times Nwn \times Nhn \tag{11}$$

The feature map constraints for the second on-chip memory can be characterized:

$$SRAM_{IFM} \geq Ihp \times Iwp \times Icp^1 \tag{12}$$

$$SRAM_{OFM} \geq Ohp^n \times Owp^n \times Ocp^n \tag{13}$$

-continued $$SRAM_{TFM^1} \geq Ohp^1 \times Owp^1 \times Oc^1 \quad (14)$$

...

$$SRAM_{TFM^{(n-1)}} \geq Ohp^{(n-1)} \times Owp^{(n-1)} \times Oc^{(n-1)} \quad (15)$$

Figure 23:
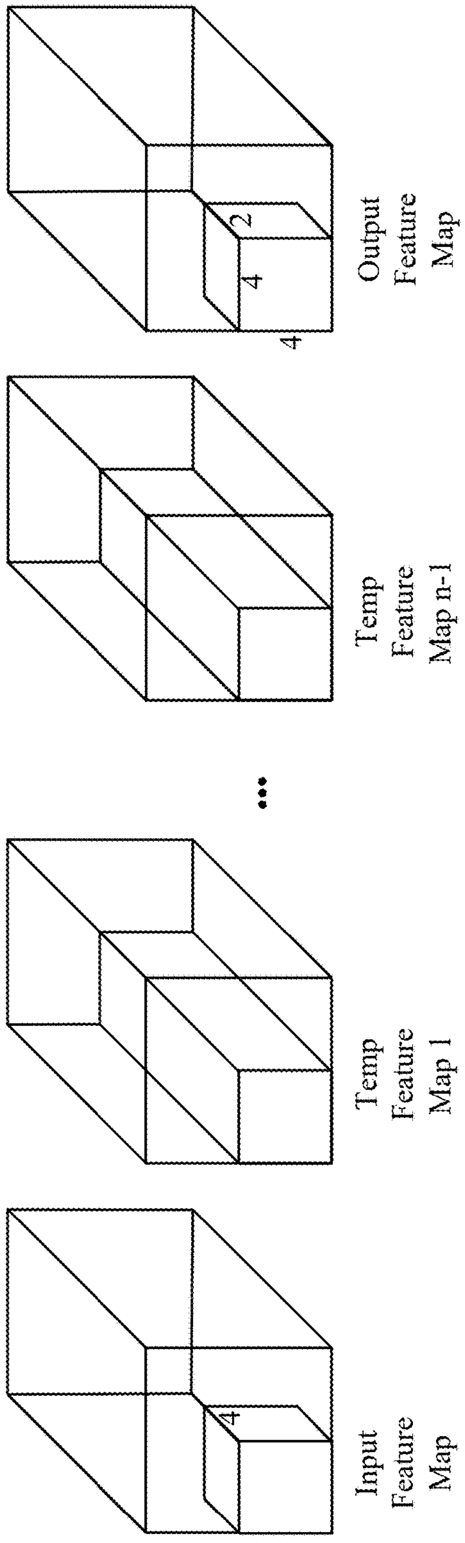
FIG. 23 shows a multiple-layer fusion, in accordance with aspects of the present technology.

Referring now to FIG. 23, a multiple-layer fusion, in accordance with aspects of the present technology, is shown, the partition output height (Ohp), partition output width (Owp), partition input channel (Icp) and partition output channel (Ocp) can be (4, 4, 4, 2). Selecting which layers can be fused can be represented according to equation 16:

$$C_{OPT}(L_{1:n}) = EMA \text{ single layer} + EMA \text{ 2-layer fusion} + EMA \text{ } n\text{-layer fusion} \quad (16)$$

Figure 24:
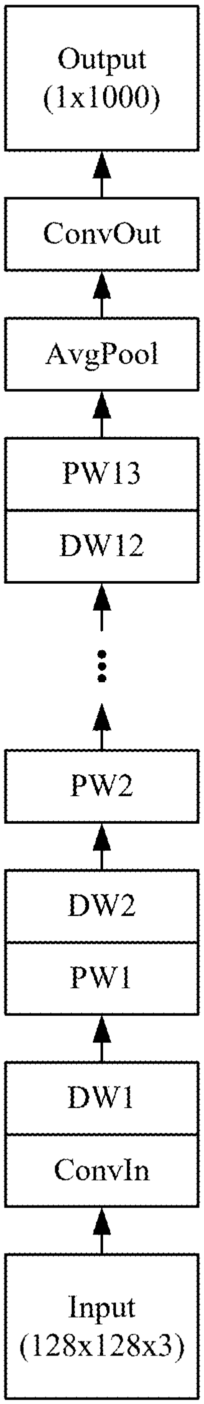
FIG. 24 shows choosing a minimum external memory access, in accordance with aspects of the present technology.

Referring to FIG. 24, choosing a minimum external memory access, in accordance with aspects of the present technology, is shown. A minimum external memory access can be chosen based on computation order, partition scheme and layer fusion-up to 2 layers. The feature map/weight constraint for the second on-chip memory (e.g., SRAM) can be 2 KB, and the partition range can be Ohp: 1-16, Owp: 1-16, Icp: 8-32, and Ocp: 8-23 for MobileNet v1.

Figure 25:
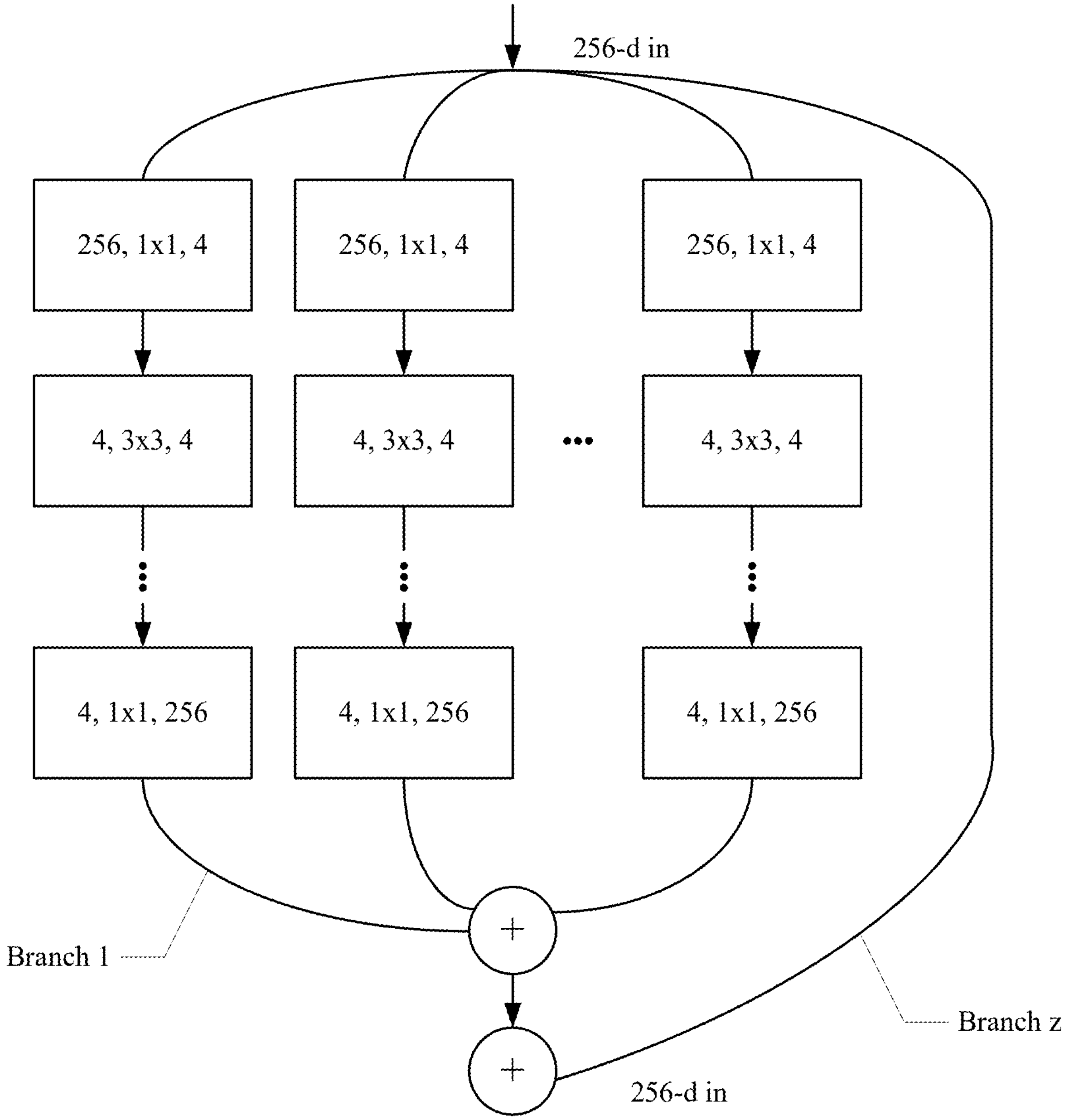
FIG. 25 shows skip-connection branches, in accordance with aspects of the present technology.

Referring now to FIG. 25, skip-connection branches, in accordance with aspects of the present technology, is shown. The external memory access can be estimated for layer addition in accordance with $$EMA_{RO} = \left[EMA_{IF_p} \times Ni + 2 \times EMA_{OF}\right] \times Nw \times Nh \times No \quad (17)$$

for single layer partition, and $$EMA_l^n = [EMA_{IFp} \times Ni_1 + 2 \times EMA_{OFp} \times Non) \times Nwm \times Nhn \quad (18)$$

for n-layer fusion.

Figure 26:
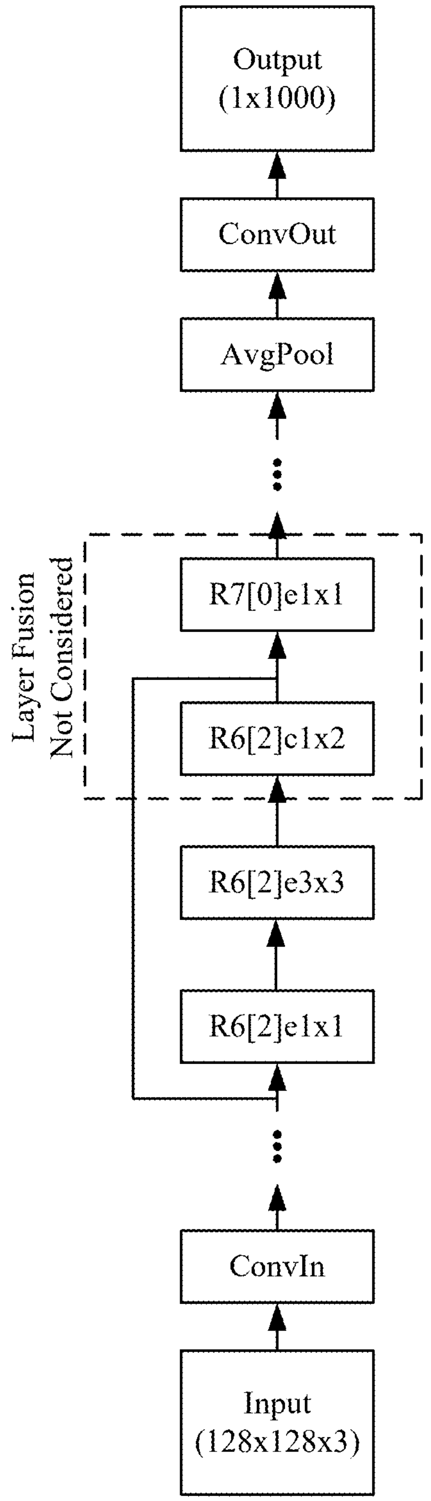
FIG. 26 shows external memory access for network with branches, in accordance with aspects of the present technology.
Figure 27:
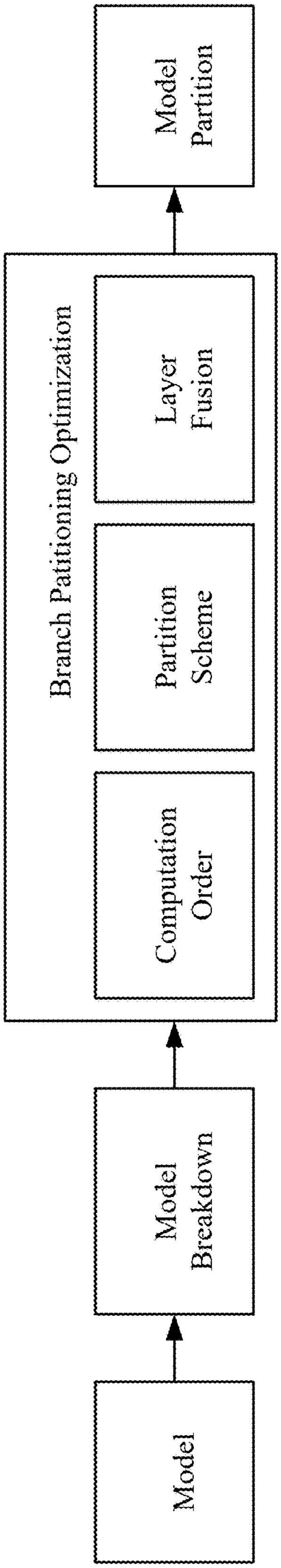
FIG. 27 shows workflow for minimizing external memory access, in accordance with aspects of the present technology.
Figure 28:
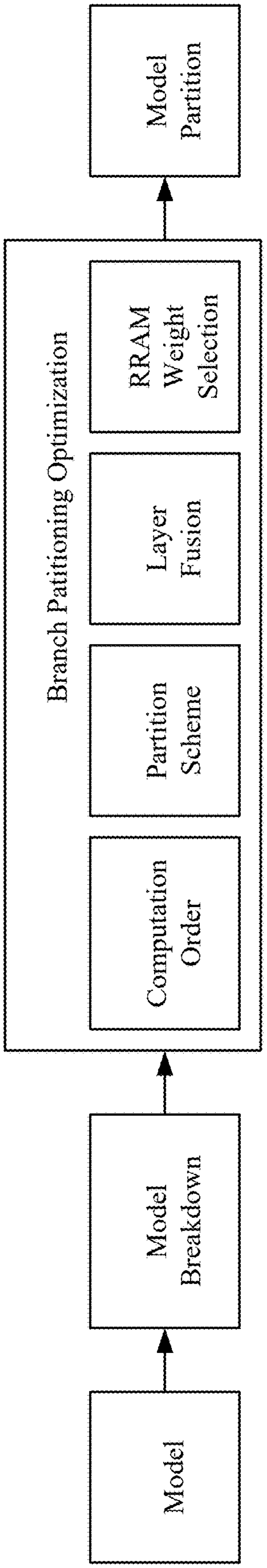
FIG. 28 shows workflow for minimizing external memory access, in accordance with aspects of the present technology.
Figure 29:
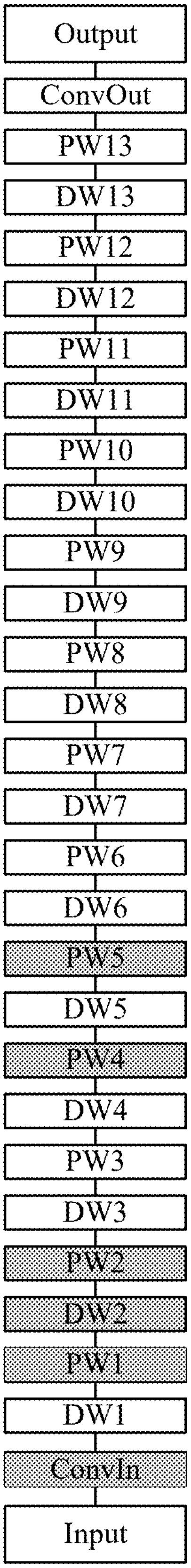
FIG. 29 shows weight memory mapping for MobileNet, in accordance with aspects of the present technology.
Figure 30:
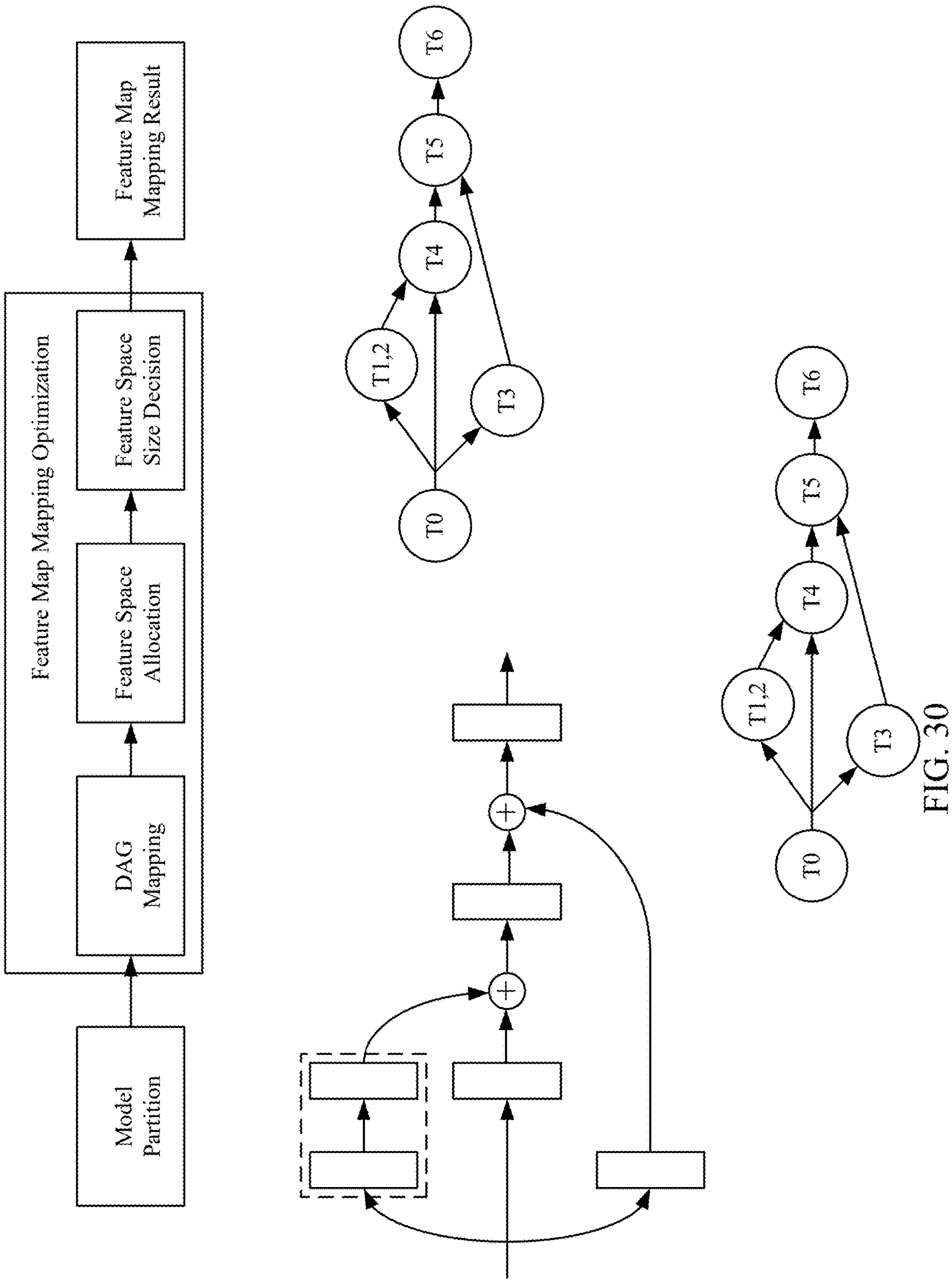
FIG. 30 shows weight memory mapping for MobileNet, in accordance with aspects of the present technology.
Figure 31:
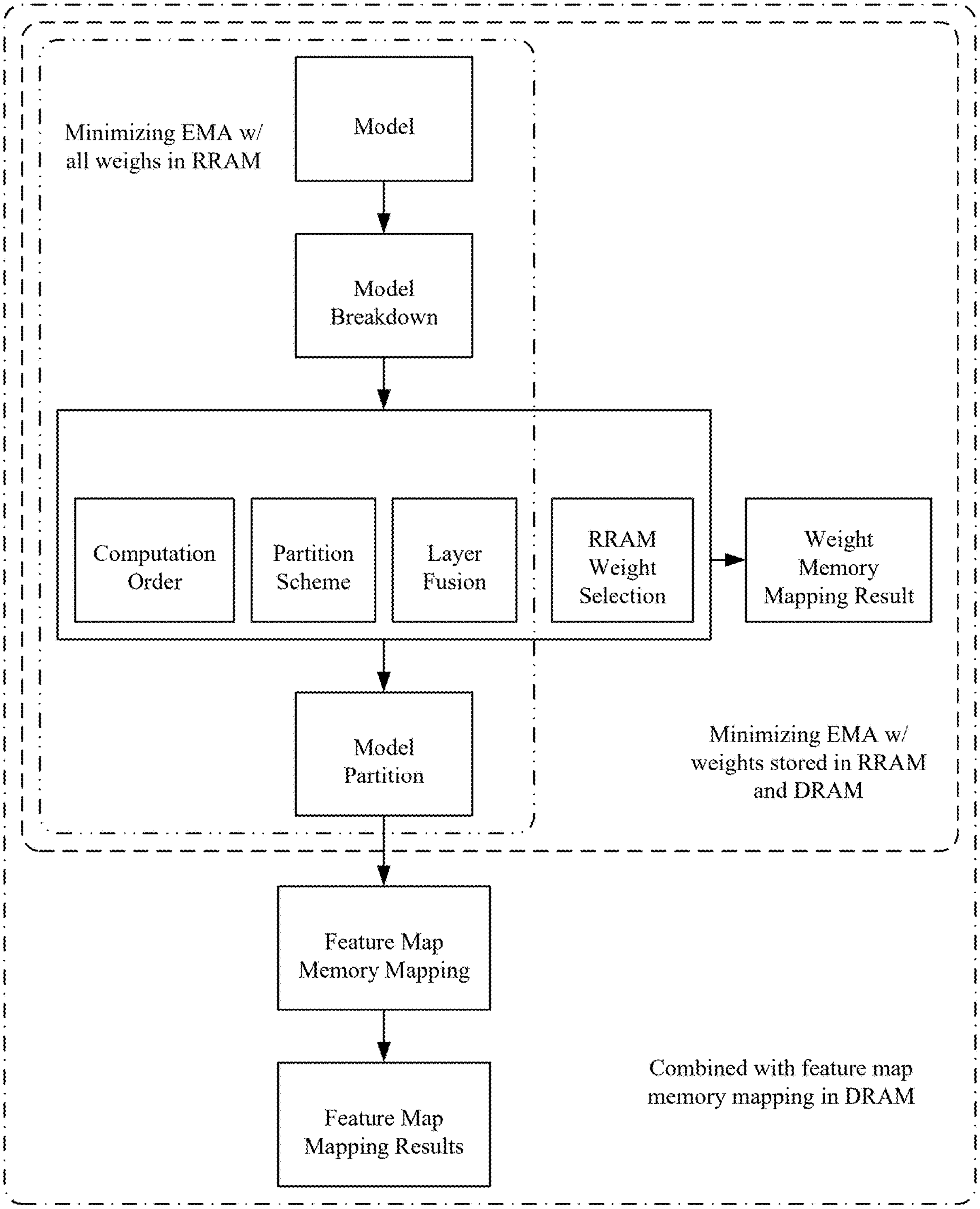
FIG. 31 shows flexible RPU architecture in accordance with aspects of the present technology.

Referring to FIG. 26, external memory access for network with branches, in accordance with aspects of the present technology is shown. The feature map/weight constraint for the second on-chip memory (e.g., SRAM) can be 2 KB, and the partition range can be Ohp: 1-16, Owp: 1-16, Icp: 8-32, and Ocp: 8-23 for MobileNet v2. Referring now to FIGS. 27 and 28, workflow for minimizing external memory access, in accordance with aspects of the present technology is shown. Referring now to FIGS. 29 and 30, weight memory mapping for MobileNet, in accordance with aspects of the present technology is illustrated. Referring to FIG. 30, feature map memory mapping in accordance with aspects of the present technology is shown. Referring now to FIG. 31, flexible RPU architecture in accordance with aspects of the present technology is shown.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A processing unit integrated circuit (IC) chip comprising:

a first on-chip memory configured to store reusable data and instructions including a first portion of weights, wherein the first portion of weights are memory mapped into the first on-chip memory from an off-chip memory; and a second on-chip memory configured to cache data and instructions stored in an off-chip memory, wherein the cache data includes a feature map, wherein the reusable data and instructions are stored in the first on-chip memory longer than the cache data and instructions in the second on-chip memory; and an on-chip compute circuitry configured to compute a convolution of the feature map and the first portion of weights including one of an output retaining order, an input retaining order or a weight retaining order partial product computation of partitions of the feature map.

2. The processing unit IC chip of claim 1, wherein the second on-chip memory comprises on-chip volatile memory.

3. The processing unit IC chip of claim 2, wherein the on-chip volatile memory comprises on-chip static random access memory (SRAM).

4. The processing unit IC chip of claim 1, wherein the first on-chip memory is further configured to update the stored reusable data and instructions from the off-chip memory.

5. The processing unit IC chip of claim 1, wherein the first on-chip memory is further configured to update the stored reusable data and instructions with run-time instructions from the compute circuitry.

6. The processing unit IC chip of claim 1, wherein the processing unit IC chip comprises a resistive processing unit (RPU).

7. The processing unit IC chip of claim 1, wherein the second on-chip memory configured to cache a portion of feature map and a second portion of the weights.

8. The processing unit IC chip of claim 7, wherein an allocation of the first portion of the weights and the second portion of the weights is based on one or more of a computation order, partition scheme, a layer fusion and a skip-connection of an artificial intelligence model and storage of the weights in the off-chip memory.

9. The processing unit IC chip of claim 1, wherein the first on-chip memory comprises on-chip non-volatile memory.

10. The processing unit IC chip of claim 9, wherein the on-chip non-volatile memory comprises a non-volatile memory selected from a group consisting of resistive random-access memory (RRAM), flash memory, and magnetoresistive random-access memory (MRAM).

11. A system comprising:

an off-chip memory configured to store weights and a feature map; and a processing unit integrated circuit (IC) chip including:

a first on-chip memory configured to store a first portion of the weights, wherein the first portion of weights are memory mapped into the first on-chip memory from an off-chip memory; and a second on-chip memory configured to cache a portion of the feature map and a second portion of the weights; and an on-chip compute circuitry configured to execute an artificial intelligence model including computation of a convolution of the feature map and the weights including one of an output retaining order, an input retaining order or a weight retaining order partial product computation of partitions of the feature map, wherein the selected one of the output retaining order, input retaining order or weight retaining order and a partition scheme of the feature map is selected to reduce external memory access to the off-chip memory as a function of one or more constraints including a feature map size, a weights size, size of the second on-chip memory and a range of axes of the partitions.

12. The system of claim 11, wherein an allocation of the first portion of the weights and the second portion of the weights is further based on a layer fusion of the artificial intelligence model.

13. The system of claim 11, wherein the allocation of the first portion of the weights and the second portion of the weights is further based on a skip-connection.

14. The system of claim 11, wherein:

the first on-chip memory comprises on-chip non-volatile memory;

the second on-chip memory comprises on-chip volatile memory; and the off-chip memory comprises off-chip volatile memory.

15. The system of claim 14, wherein:

the on-chip non-volatile memory comprises a non-volatile memory selected from a group consisting of resistive random-access memory (RRAM), flash memory, and magnetoresistive random-access memory (MRAM);

the on-chip volatile memory comprises on-chip static random-access memory (SRAM); and the off-chip volatile memory comprises off-chip dynamic random-access memory (DRAM).

16. The system of claim 11, wherein:

the first on-chip memory is further configured to store a first portion of instructions of the artificial intelligence model; and the second on-chip memory is further configured to cache a second portion of instructions of the artificial intelligence model.

17. The system of claim 16, wherein the first on-chip memory is further configured for updating one or both of the first portion of the weights and the first portion of the instructions of the artificial intelligence model from the off-chip memory.

18. The system of claim 16, wherein the first on-chip memory is further configured for updating one or both of the first portion of the weights and the first portion of the instructions of the artificial intelligence model with run-time instructions from the on-chip compute circuitry.

19. The system of claim 11, wherein the off-chip memory stores the feature map based on a mapping of the feature map to a topology of the artificial intelligence model.

* * * * *